United States Patent
Ninose et al.

(10) Patent No.: US 7,636,822 B2
(45) Date of Patent: Dec. 22, 2009

(54) METHOD OF CHECKING THE TOPOLOGY OF REMOTE COPY

(75) Inventors: Kenta Ninose, Yokohama (JP); Hiroshi Arakawa, Sagamihara (JP); Yuri Hiraiwa, Sagamihara (JP); Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 852 days.

(21) Appl. No.: 11/169,886

(22) Filed: Jun. 30, 2005

(65) Prior Publication Data

US 2006/0248296 A1  Nov. 2, 2006

(30) Foreign Application Priority Data

Apr. 28, 2005 (JP) ............... 2005-131610

(51) Int. Cl.
G06F 12/00 (2006.01)
G06F 13/00 (2006.01)
G06F 13/28 (2006.01)

(52) U.S. Cl. ..................................... 711/162
(58) Field of Classification Search ................. 711/162
See application file for complete search history.

(56) References Cited

U.S. PATENT DOCUMENTS

| | | | |
|---|---|---|---|
| 6,209,002 B1 | 3/2001 | Gagne et al. | |
| 6,701,455 B1* | 3/2004 | Yamamoto et al. | 714/18 |
| 6,879,594 B1* | 4/2005 | Lee et al. | 370/408 |
| 2002/0176370 A1* | 11/2002 | Ohba et al. | 370/252 |
| 2003/0149764 A1* | 8/2003 | Beaulieu | 709/224 |
| 2004/0103254 A1* | 5/2004 | Satoyama et al. | 711/150 |
| 2004/0202186 A1* | 10/2004 | Kimura et al. | 370/395.65 |
| 2004/0226021 A1* | 11/2004 | Miki et al. | 719/313 |
| 2005/0076140 A1* | 4/2005 | Fung | 709/245 |
| 2005/0117528 A1* | 6/2005 | Hauck et al. | 370/276 |

FOREIGN PATENT DOCUMENTS

JP  2003-122509  4/2003

* cited by examiner

Primary Examiner—Sheng-Jen Tsai
(74) Attorney, Agent, or Firm—Antonelli, Terry, Stout & Kraus, LLP.

(57) ABSTRACT

Provided is a computer system management method capable of preventing a loop of pairs from being formed upon remote copy pair formation. The method of controlling formation of a remote copy pair of logical volumes in a computer system including a plurality of logical volumes includes: receiving a request to form a remote copy pair; judging whether or not a loop of remote copy pairs will be formed by executing the requested remote copy pair formation; and executing the requested remote copy pair formation when it is judged that no loop of copy pairs will be formed.

12 Claims, 21 Drawing Sheets

PAIR INFORMATION TABLE OF STORAGE SYSTEM (#10)

| PRIMARY VOL INFORMATION | | SECONDARY VOL INFORMATION | |
|---|---|---|---|
| STORAGE SYSTEM NUMBER | VOL NUMBER | STORAGE SYSTEM NUMBER | VOL NUMBER |
| #10 | 0001 | #11 | FFA0 |

FIG.3

PAIR INFORMATION TABLE OF STORAGE SYSTEM (#11)

| PRIMARY VOL INFORMATION | | SECONDARY VOL INFORMATION | |
|---|---|---|---|
| STORAGE SYSTEM NUMBER | VOL NUMBER | STORAGE SYSTEM NUMBER | VOL NUMBER |
| #10 | 0001 | #11 | FFA0 |
| #11 | FFA0 | #22 | 0002 |

FIG.4

PAIR INFORMATION TABLE OF STORAGE SYSTEM (#22)

| PRIMARY VOL INFORMATION || SECONDARY VOL INFORMATION ||
|---|---|---|---|
| STORAGE SYSTEM NUMBER | VOL NUMBER | STORAGE SYSTEM NUMBER | VOL NUMBER |
| #11 | FFA0 | #22 | 0002 |

FIG.5

TOPOLOGY INFORMATION TABLE

| PRIMARY VOL INFORMATION || SECONDARY VOL INFORMATION ||
| --- | --- | --- | --- |
| STORAGE SYSTEM NUMBER | VOL NUMBER | STORAGE SYSTEM NUMBER | VOL NUMBER |
| #10 | 0001 | #11 | FFA0 |
| #11 | FFA0 | #22 | 0002 |

FIG.6

TOPOLOGY INFORMATION TABLE OF WHEN LOOP IS FORMED

| PRIMARY VOL INFORMATION | | SECONDARY VOL INFORMATION | |
|---|---|---|---|
| STORAGE SYSTEM NUMBER | VOL NUMBER | STORAGE SYSTEM NUMBER | VOL NUMBER |
| #10 | 0001 | #11 | FFA0 |
| #11 | FFA0 | #22 | 0002 |
| #22 | 0002 | #10 | 0001 |

FIG.10

VOL INFORMATION TABLE

| VOL NUMBER | FORMAT | CAPACITY | PAIR ID |
|---|---|---|---|
| 0001 | Open-3 | 3GB | foo |

FIG.19

METHOD OF CHECKING THE TOPOLOGY OF REMOTE COPY

BACKGROUND

This invention relates to remote copy in computer systems.

In recent years, the operations of companies and other organizations have come to depend on computer systems, and data managed by such computer systems is gaining its importance. As a result, storage systems where data is stored are demanded to have availability high enough to keep the systems running without losing data in the event of a system failure, disasters, or the like.

One measure proposed to answer the demand is the remote copy technology in which two or more storage systems connected to one another store the same data. According to the remote copy technology, when data is updated in a volume of one of storage systems, the updated data is copied to another of the storage systems that is connected to this storage system. This makes a data update in one volume destaged to another volume, ensuring the consistency of data stored in these volumes. Therefore, in the case where one volume is put out of use by a system failure or disasters, a data loss or shutdown of the system can be avoided by using another volume.

The early connection form (topology) of remote copy has been a simple one composed of only two volumes with one acting as a copy source and the other as a copy target. Topologies that have been proposed lately are more complicated, and some of them are composed of three or more volumes in order to achieve higher availability. Typical examples of such topologies are multi target topologies and cascading topologies. A multi target topology is a form in which one copy source volume is paired with plural copy target volumes (see JP 2003-122509 A, for example). Here, the term pair refers to a combination of a copy source volume and a copy target volume. A cascading topology is a form in which plural pairs are linked in series (see U.S. Pat. No. 6,209,002, for example). It is also possible to combine a multi target topology and a cascading topology to build an even more complicated topology.

SUMMARY

When a cascading topology is employed, pairs can be formed in a manner that connects plural volumes in a loop. In this case, however, updated data is repeatedly circulated through the plural volumes connected in a loop. The circulation, far from contributing to improvement of the availability, wastes resources of the computer system and lowers the system performance.

It is therefore necessary for the administrator of the system to make sure that the act of pairing volumes does not result in forming a loop of pairs. This increases the burden of the system administrator when a cascading topology and a multi target topology are combined, as described above, to obtain a complicated topology where grasping the topology in its entirety is difficult. In addition, the system administrator might instruct to form a loop of pairs by mistake.

This invention has been made in view of the above problems, and an object of this invention is to provide a computer system management method that avoids forming a loop of pairs.

According to an embodiment of this invention, there is provided a method of controlling formation of a remote copy pair of logical volumes in a computer system including a plurality of logical volumes, including: receiving a request to form a remote copy pair; judging whether or not a loop of remote copy pairs will be formed by executing the requested remote copy pair formation; and executing the requested remote copy pair formation when it is judged that no loop of copy pairs will be formed.

According to this invention, forming a loop of pairs through remote copy in a computer system can be avoided.

BRIEF DESCRIPTION OF THE DRAWINGS

FIG. 3 is an explanatory diagram of a pair information table of a first storage system according to the first embodiment of this invention.

FIG. 4 is an explanatory diagram of a pair information table of a second storage system according to the first embodiment of this invention.

FIG. 5 is an explanatory diagram of a pair information table of a third storage system according to the first embodiment of this invention.

FIG. 6 is an explanatory diagram of a topology information table according to the first embodiment of this invention.

FIG. 10 is an explanatory diagram of an example of a topology information table for a case where a loop of pairs is formed in the first embodiment of this invention.

FIG. 19 is an explanatory diagram of a VOL information table according to the third embodiment of this invention.

DETAILED DESCRIPTION OF THE PREFERRED EMBODIMENTS

Embodiments of this invention will be described below with reference to the accompanying drawings.

Figure 1:
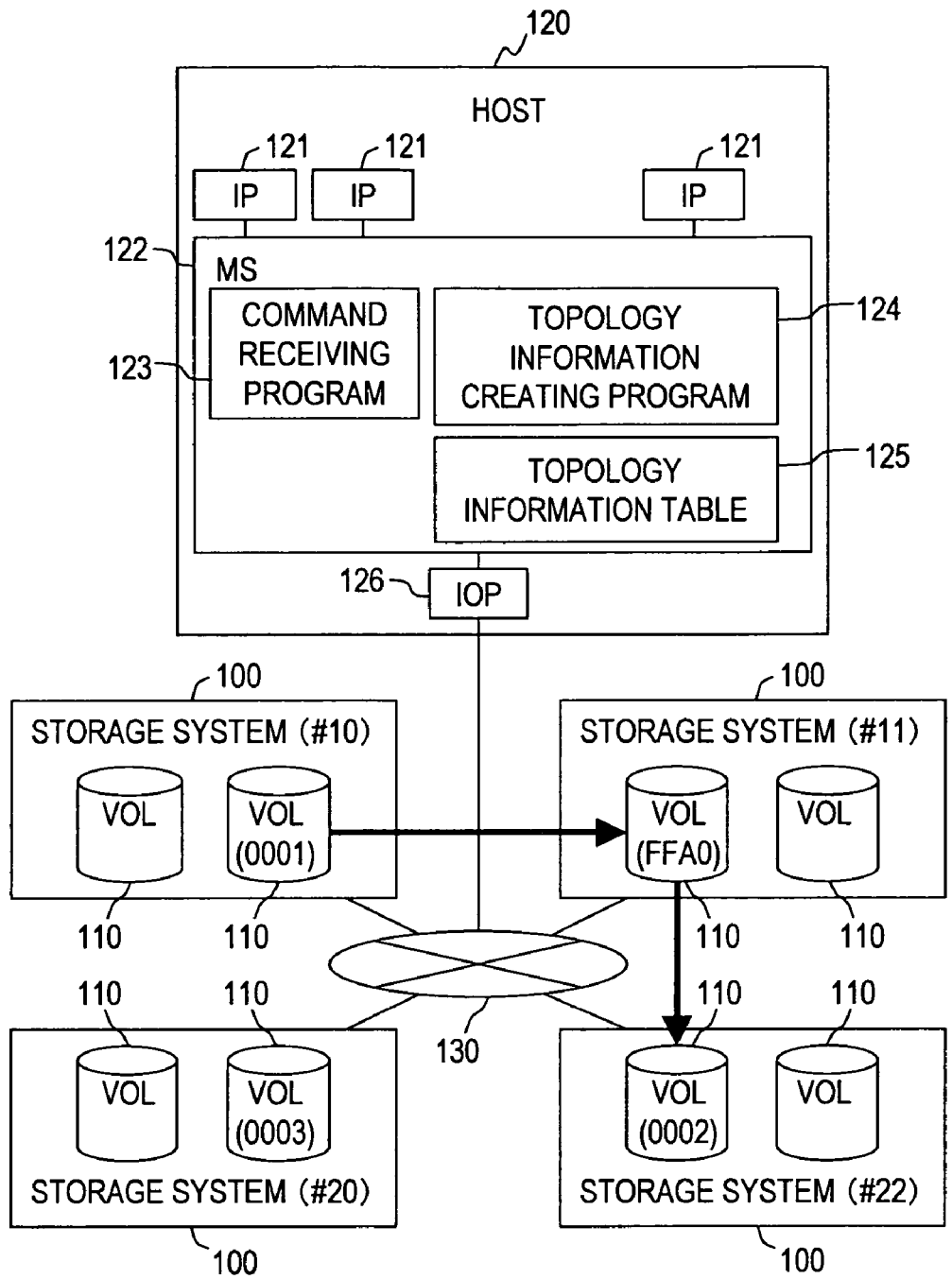
FIG. 1 is a block diagram showing a configuration of a computer system according to a first embodiment of this invention.

FIG. 1 is a block diagram showing the configuration of a computer system according to a first embodiment of this invention.

The computer system according to this embodiment is composed of plural storage systems 100, one host 120, and a network 130, which interconnects the storage systems and the host.

The storage systems 100 are storage drives to provide data storage areas to the host 120. The storage systems 100 of this embodiment may be disk array devices each composed of plural disk drives. The configuration of the storage systems 100 will be described later in detail with reference to FIG. 2.

The computer system of this embodiment includes an arbitrary number of storage systems 100. There are four storage systems 100 shown in FIG. 1.

Each storage system 100 is identified by a storage system number. The four storage systems 100 in FIG. 1 respectively have storage system numbers "#10", "#11 ", "#20", and "#22", which are shown in parentheses.

The storage area of each storage system 100 is managed as an arbitrary number of logical volumes (VOLs) 110. Each VOL 110 is recognized as one logical disk drive by the host 120.

Each VOL 110 is identified by a VOL number. In the example of FIG. 1, one of the VOLs 110 in the storage system 100 "#10" has a VOL number of "0001". One of the VOLs 110 in the storage system 100 "#11" has a VOL number of "FFA0". One of the VOLs 110 in the storage system 100 "#20" has a VOL number of "0003". One of the VOLs 110 in the storage system 100 "#22" has a VOL number of "0002".

In this embodiment, any two VOLs 110 can form a remote copy pair (hereinafter simply referred to as "pair").

Remote copy is a technology in which data stored in one VOL 110 is copied to another VOL 110 that is physically apart from the former so that these two VOLs 110 store the same data in order to avoid a data loss from disasters or the like. One VOL 110 from which data is copied is called a primary VOL and another VOL 110 to which data is copied is called a secondary VOL.

In FIG. 1, pairs are indicated by arrows. The VOLs 110 at the bases of the arrows are primary VOLs, and the VOLs 110 at the tips of the arrow are secondary VOLs. In the example of FIG. 1, the VOLs 110 "0001" and "FFA0" constitute one pair whereas the VOLs 110 "FFA0" and "0002" constitute another pair. Data stored in the VOL 110 "0001" is copied to and stored in the VOL 110 "FFA0" via the network 130, and further copied from the VOL 110 "FFA0" to the VOL 110 "0002" to be stored in the VOL 110 "0002". A configuration in which plural pairs are linked in series as this is called a cascading configuration.

In the following description, primary VOLs 110 of pairs in a cascading configuration are referred to as "upper" volumes whereas secondary 110 of the pairs are referred to as "lower" volumes. For instance, in FIG. 1, the VOL 110 "0002" is a lower VOL 110 than the VOL 110 "0001".

The host 120 is a computer to manage every storage system 100. The host 120 is composed of one or more instruction processors (IPs) 121, a main storage (MS) 122, and one or more input/output ports (IOPs) 126.

The IP 121 is a processor to execute programs stored in the MS 122.

The MS 122 is, for example, a semiconductor memory. Programs executed by the IP 121 and information consulted upon execution of the programs are stored in the MS 122. The MS 122 of this embodiment stores, at least, a command receiving program 123, a topology information creating program 124, and a topology information table 125. These programs and information are used to pair up VOLs 110. Pair formation is processing of setting two arbitrarily chosen VOLs 110 as a new pair. The programs and information will be described later in detail. The MS 122 may also store other programs (for example, an application program that enables the host 120 to use the storage systems 100 and provide a service to a user).

The IOP 126 is an interface to connect the host 120 to the network 130. The host 120 communicates with the storage systems 100 via the IOP 126 and the network 130.

The computer system of this embodiment may include another host (not shown) which uses the storage systems 100 to provide a service to a user. Such a host does not have the command receiving program 123, the topology information creating program 124 and the topology information table 125 unlike the host 120 of FIG. 1. Accordingly, the host 120 alone can instruct the storage systems 100 to form a pair in this embodiment.

The network 130 is a network that mediates communications between the host 120 and the plural storage systems 100. The network 130 of this embodiment may be a storage area network (SAN), an IP-SAN, or the like, or may be a combination of such networks.

Figure 2:
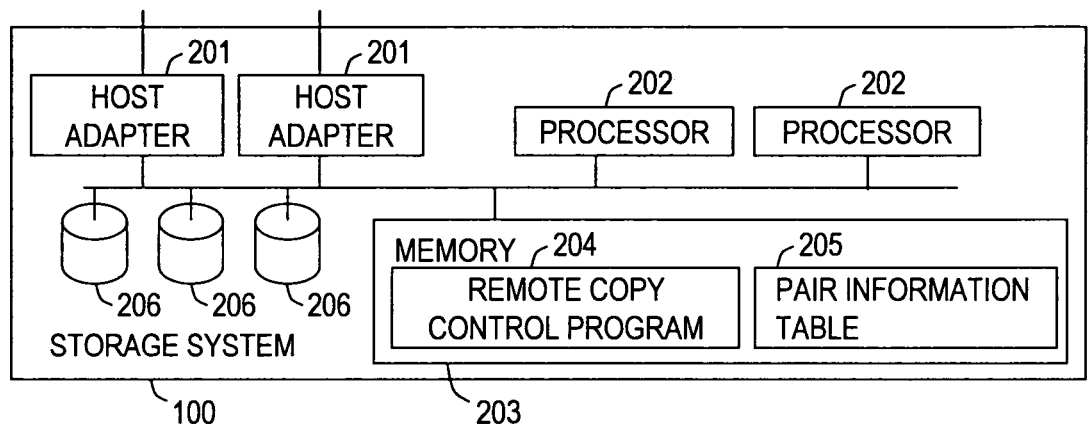
FIG. 2 is a block diagram showing a configuration of a storage system according to the first embodiment of this invention.

FIG. 2 is a block diagram showing the configuration of the storage system 100 according to the first embodiment of this invention.

The storage system 100 of this embodiment is composed of one or more host adapters 201, one or more processors 202, a memory 203, and one or more disk drives 206.

The host adapter 201 is an interface connected to the network 130 in order to communicate with other storage systems 100 or with the host 120.

The processor 202 executes programs stored in the memory 203.

The memory 203 is, for example, a semiconductor memory and stores programs executed by the processor 202 and other data. The memory 203 of this embodiment stores, at least, a remote copy control program 204 and a pair information table 205. The program and data will be described later in detail.

The disk drive 206 is, for example, a hard disk drive to store data.

Described next is the pair information table 205 stored in the memory 203 of each storage system 100. The pair information table 205 in each storage system 100 holds information about pairs to which the VOLs 110 of the storage system 100 belong.

FIG. 3 is an explanatory diagram of the pair information table 205 of the storage system 100 "#10" according to the first embodiment of this invention.

The pair information table 205 of the storage system 100 "#10" holds information about primary VOLs and secondary VOLs (primary VOL information 310 and secondary VOL information 320) of pairs to which the VOLs 110 in the storage system 100 "#10" belong. The primary VOL information 310 is composed of a storage system number 311 of the storage system where a primary VOL is located and a VOL number 312 of the primary VOL. Similarly, the secondary VOL information 320 is composed of a storage system number 321 of the storage system where a secondary VOL is located and a VOL number 322 of the secondary VOL. One pair makes one row (entry) of the pair information table 205.

As shown in FIG. 1, the VOL 110 "0001" of the storage system 100 "#10" belongs to one pair. A row 301 holds information of this pair. The primary VOL of the pair is the VOL 110 "0001", and the secondary VOL of the pair is the VOL 110 "FFA0" of the storage system 100 "#11". Accordingly, in the primary VOL information 310 of the row 301, "#10" is entered as the storage system number 311 and "0001" is entered as the VOL number 312. Similarly, in the secondary VOL information 320 of the row 301, "#11" is entered as the storage system number 321 and "FFA0" is entered as the VOL number 322.

FIG. 4 is an explanatory diagram of the pair information table 205 of the storage system 100 "#11" according to the first embodiment of this invention.

As shown in FIG. 1, the VOL 110 "FFA0" of the storage system 100 "#11" belongs to two pairs. One of the two pairs has the VOL 110 "0001" of the storage system 100 "#10" as the primary VOL and has the VOL 110 "FFA0" of the storage system 100 "#11" as the secondary VOL. A row 401 holds information of this pair. Accordingly, in the primary VOL information 310 of the row 401, "#10" is entered as the storage system number 311 and "0001" is entered as the VOL number 312. In the secondary VOL information 320 of the row 401, "#11" is entered as the storage system number 321 and "FFA0" is entered as the VOL number 322.

The other pair to which the VOL 110 "FFA0" belongs has the VOL 110 "FFA0" of the storage system 100 "#11" as the primary VOL and has the VOL 110 "0002" of the storage system 100 "#22" as the secondary VOL. A row 402 holds information of this pair. Accordingly, in the primary VOL information 310 of the row 402, "#11" is entered as the storage system number 311 and "FFA0" is entered as the VOL number 312. In the secondary VOL information 320 of the row 402, "#22" is entered as the storage system number 321 and "0002 is entered as the VOL number 322.

FIG. 5 is an explanatory diagram of the pair information table 205 of the storage system 100 "#22" according to the first embodiment of this invention.

As shown in FIG. 1, the VOL 110 "0002" of the storage system 100 "#22" belongs to one pair. The pair has the VOL 110 "FFA0" of the storage system 100 "#11" as the primary VOL and has the VOL 110 "0002" of the storage system 100 "#22" as the secondary VOL. A row 501 holds information of this pair. Accordingly, in the primary VOL information 310 of the row 501, "#11" is entered as the storage system number 311 and "FFA0" is entered as the VOL number 312. In the secondary VOL information 320 of the row 501, "#22" is entered as the storage system number 321 and "0002" is entered as the VOL number 322.

Described next is the topology information table 125 stored in the MS 122 of the host 120. The topology information table 125 holds information about the connection form (topology) of every pair that is formed in the storage systems 100 managed by the host 120.

FIG. 6 is an explanatory diagram of the topology information table 125 according to the first embodiment of this invention.

As shown in FIG. 1, the host 120 of this embodiment manages at least four storage systems 100. The topology information table 125 holds information about the primary VOL (primary VOL information 610) and information about secondary VOL (secondary VOL information 620) of every pair that is formed in these four storage systems 100. The primary VOL information 610 is composed of a storage system number 611 of the storage system where a primary VOL is located and a VOL number 612 of the primary VOL. Similarly, the secondary VOL information 620 is composed of a storage system number 621 of the storage system where a secondary VOL is located and a VOL number 622 of the secondary VOL. One pair makes one row (entry) of the topology information table 125.

In the example of FIG. 1, two pairs are formed in the storage systems 100, 100, 100 . . . managed by the host 120. One of the two pairs has the VOL 110 "0001" of the storage system 100 "#10" as the primary VOL and has the VOL 110 "FFA0" of the storage system 100 "#11" as the secondary VOL. A row 601 holds information of this pair. Accordingly, in the primary VOL information 610 of the row 601, "#10" is entered as the storage system number 611 and "0001" is entered as the VOL number 612. In the secondary VOL information 620 of the row 601, "#11" is entered as the storage system number 621 and "FFA0" is entered as the VOL number 622.

The other pair has the VOL 110 "FFA0" of the storage system 100 "#11" as the primary VOL and has the VOL 110 "0002" of the storage system 100 "#22" as the secondary VOL. A row 602 holds information of this pair. Accordingly, in the primary VOL information 610 of the row 602, "#11" is entered as the storage system number 611 and "FFA0" is entered as the VOL number 612. In the secondary VOL information 620 of the row 602, "#22" is entered as the storage system number 621 and "0002 is entered as the VOL number 622.

Next, processing executed by the respective programs will be described.

Figure 7:
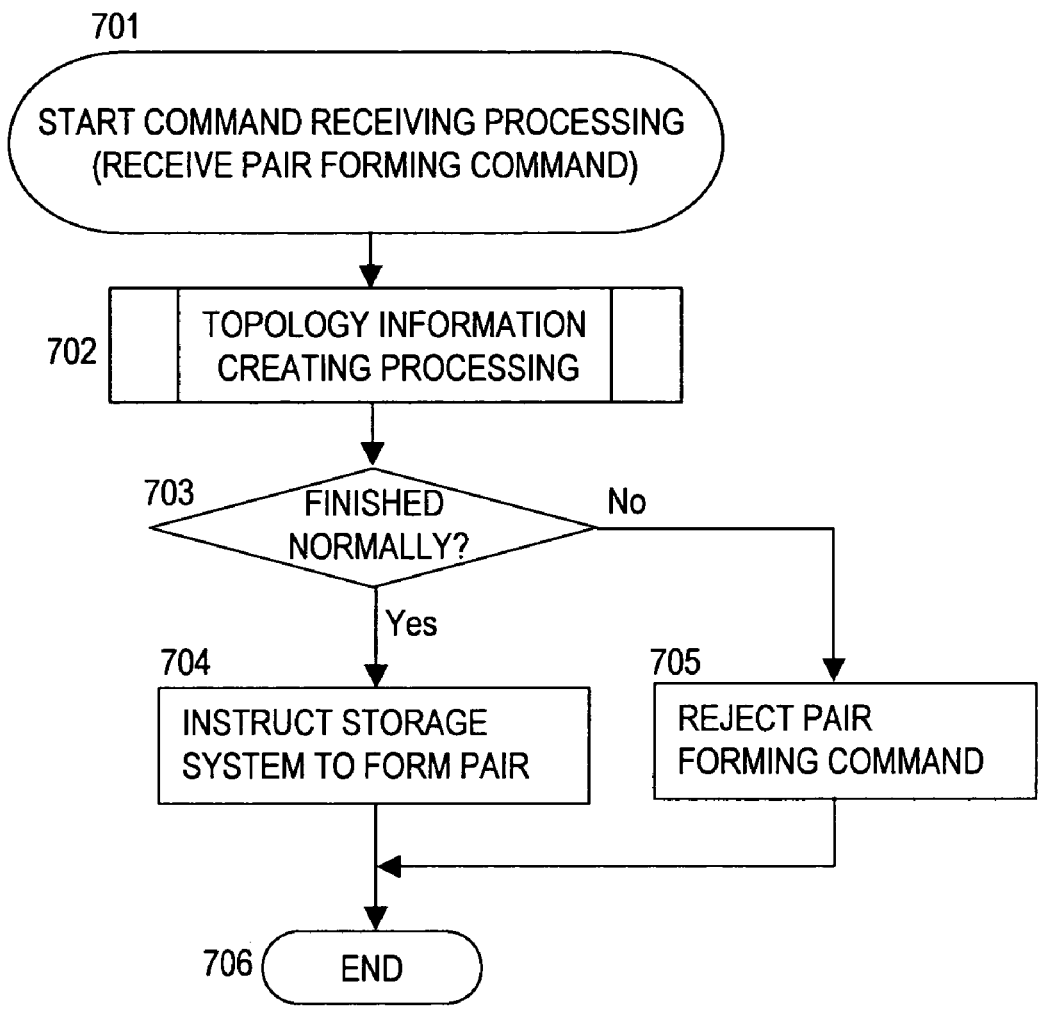
FIG. 7 is a flow chart of command receiving processing according to the first embodiment of this invention.

FIG. 7 is a flow chart of command receiving processing according to the first embodiment of this invention.

The command receiving processing is processing in which the host 120 receives, from a system administrator or the like, a pair forming command requesting to form a new pair, and instructs the storage system 100 to form a new pair as requested. The command receiving program 123 executes the command receiving processing.

When the host 120 receives a pair forming command from a system administrator or the like, the command receiving program 123 starts the command receiving processing (701). The receiving pair forming command contains, at least, the VOL number and the storage system number of the primary VOL of the new pair that the system administrator or the like intends to form, and the VOL number and the storage system number of the secondary VOL of the new pair. The information is hereinafter referred to as "received pair information".

The command receiving program 123 then calls up the topology information creating program 124 to have topology information creating processing executed (702).

The topology information creating processing is processing in which topology information of the pair to be newly formed is created and stored in the topology information table 125. A loop check is also executed in the topology information creating processing. The loop check is processing to judge whether or not formation of the requested pair results in creating a loop of pairs.

For instance, the computer system of FIG. 1 has a pair consisting of the VOL 110 "0001" and the VOL 110 "FFA0", and a pair consisting of the VOL 110 "FFA0" and the VOL 110 "0002". When, in this state, a pair having the VOL 110 "0002" as the primary VOL and the VOL 110 "0001" as the secondary VOL is newly formed, the new pair and the existing two pairs form a loop of pairs.

When data of, for example, the VOL 110 "0001" is updated in this case, the updated data is copied from the VOL 110 "0001" to the VOL 110 "FFA0", from the VOL 110 "FFA0" to the VOL 110 "0002", and from the VOL 110 "0002" to the VOL 110 "0001", and then copied from the VOL 110 "0001" to the VOL 110 "FFA0" again. Thus, the updated data is repeatedly circulated in the loop of pairs.

An object of this invention is to avoid forming such a loop of pairs.

Specific steps of the topology information creating processing will be described later in detail with reference to FIGS. 8 and 9.

Next, the command receiving program 123 judges whether or not the topology information creating processing has been finished normally (703).

When it is judged in the step 703 that the topology information creating processing has been finished normally, there is no possibility that a loop of pairs will be formed, and the requested pair formation can therefore be executed. The command receiving program 123 instructs the storage system 100 to form the pair (704).

Specifically, the received pair information and a pair forming instruction are sent to the storage system 100 that has the primary VOL designated by the received pair information (the primary storage system). The remote copy control program 204 of the storage system 100 that has received the instruction updates the pair information table 205 based on the received pair information. The remote copy control program 204 also sends the received pair information and the pair forming instruction to the storage system 100 that has the secondary VOL designated by the received pair information (the secondary storage system). The remote copy control program 204 of the secondary storage system 100 that has received the instruction updates the pair information table 205 based on the received pair information. As a result, the requested new pair is formed from the primary VOL and the secondary volume.

On the other hand, when it is judged in the step 703 that the topology information creating processing has not been finished normally (has been finished abnormally), it means that a loop of pairs is formed and therefore the requested pair formation cannot be executed. The command receiving program 123 rejects the pair forming command (705). As a result, the requested pair is not formed.

As the step 704 or 705 is finished, the command receiving processing is ended (706).

Figure 8:
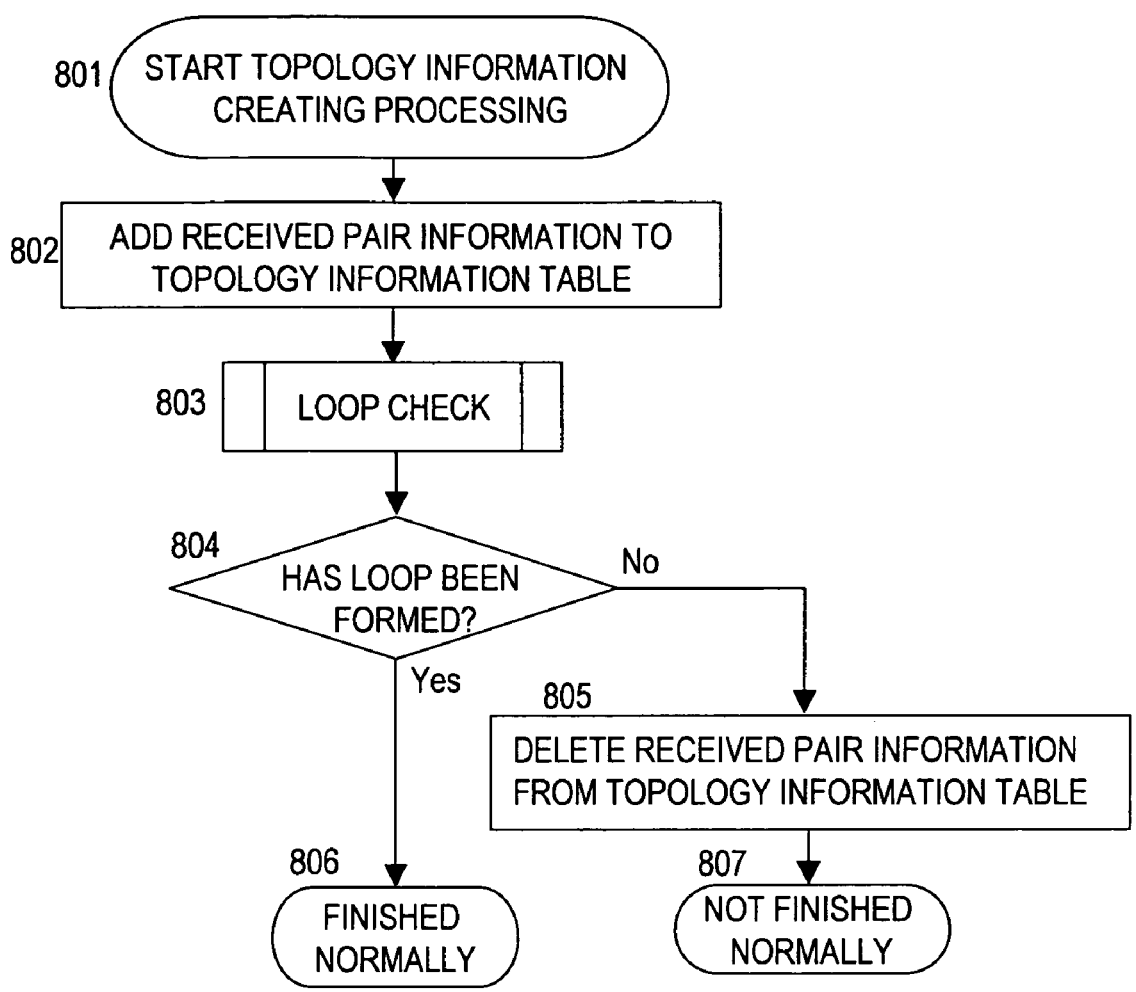
FIG. 8 is a flow chart of topology information creating processing according to the first embodiment of this invention.

FIG. 8 is a flow chart of topology information creating processing according to the first embodiment of this invention.

The topology information creating processing is processing in which the topology information creating program 124 creates topology information of a pair to be formed newly, and stores the information in the topology information table 125.

Called up in the step 702 of FIG. 7, the topology information creating program 124 starts the topology information creating processing (801).

First, the topology information creating program 124 adds the received pair information to the topology information table 125 (802).

The topology information creating program 124 then executes a loop check (803). Steps of the loop check will be described later in detail with reference to FIG. 9.

Next, the topology information creating program 124 judges, from the result of the loop check, whether or not a loop of pairs will be formed (804).

When it is judged in the step 804 that a loop of pairs will be formed, the requested pair formation is not executed. The topology information creating program 124 deletes, from the topology information table 125, the received pair information which has been added in the step 802 (805). This ends the topology information creating processing abnormally (807).

On the other hand, when it is judged in the step 804 that a loop of pairs will not be formed, the topology information creating processing is finished normally in order to execute the requested pair formation (806).

Figure 9:
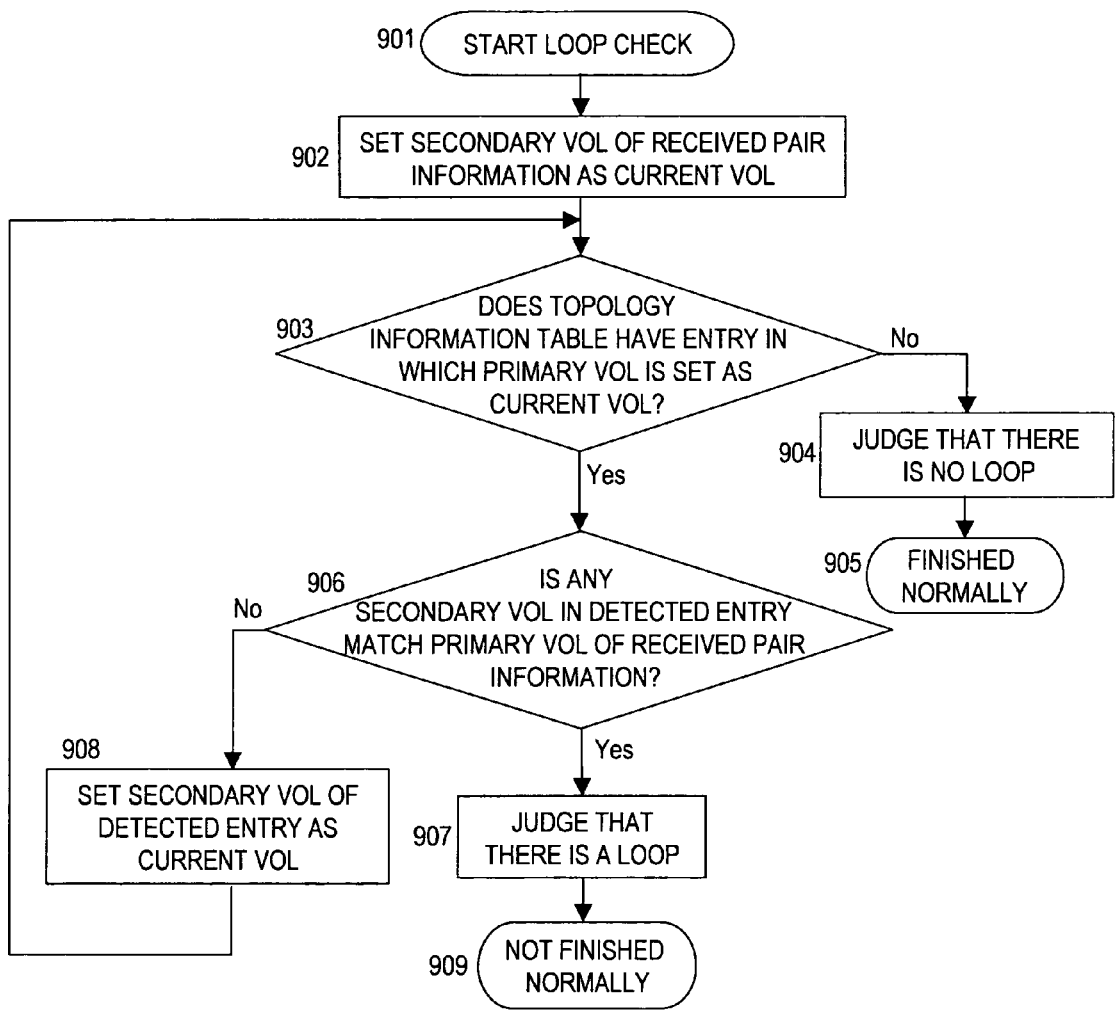
FIG. 9 is a flow chart of a loop check according to the first embodiment of this invention.

FIG. 9 is a flow chart of a loop check according to the first embodiment of this invention.

As a loop check is started in the step 803 of FIG. 8 (901), the topology information creating program 124 sets the secondary VOL of the received pair information as a current VOL (902).

The topology information creating program 124 next judges whether or not the topology information table 125 has an entry in which the current VOL is set as a primary VOL (903). An entry corresponds to a row of the topology information table 125. Specifically, the topology information creating program 124 searches the topology information table 125 for a combination of the storage system number 611 and the VOL number 612 of the primary VOL information 610 that matches the combination of the storage system number and the VOL number of the current VOL and, when such an entry is found, judges that the table has an entry in which the current VOL is set as a primary VOL.

When it is judged in the step 903 that there is no entry in which the current VOL is set as a primary VOL, it means that the current VOL is not registered as a primary VOL in any of existing pairs, and that the current VOL is the secondary VOL of the pair to be newly formed or the lower VOL 110 than this secondary VOL. Therefore, the primary VOL of the pair to be newly formed is not below the secondary VOL of the pair to be newly formed in this case. In other words, there is no possibility that the pair to be newly formed, together with the existing pairs, will form a loop. Then the topology information creating program 124 judges that the pairs will not form a loop (904), and ends the loop check normally (905).

On the other hand, when it is judged in the step 903 that there is an entry in which the current VOL is set as a primary VOL, it means that the current VOL is registered as a primary VOL in one of existing pairs, and that there is a possibility that the pair to be newly formed may form a loop with the existing pairs. Specifically, a loop of pairs is formed when the primary VOL of the pair to be newly formed is below the secondary VOL of the pair to be newly formed. The topology information creating program 124 therefore judges whether or not the secondary VOL of any entry that is detected in the step 903 (in other words, an entry where the current VOL is set as a primary VOL) matches the primary VOL of the received pair information (906).

When it is judged in the step 906 that the secondary VOL of a detected entry matches the primary VOL of the received pair information, it means that the primary VOL of the pair to be newly formed is below the secondary VOL of the pair to be newly formed. Then it is judged that the pairs will form a loop (907), and the loop check is ended abnormally (909).

In some cases, the primary VOL of the pair to be newly formed is further below the secondary VOL of an entry detected in the step 903 when it is judged in the step 906 that no secondary VOL of a detected entry matches the primary VOL of the received pair information. In this case, the secondary VOL of the entry detected in the step 903 is set as the current VOL and the processing returns to the step 903 to judge whether or not the primary VOL of the pair to be newly formed is further below the current VOL (903, 906, . . . ).

FIG. 10 is an explanatory diagram of an example of the topology information table 125 for a case where a loop of pairs is formed in the first embodiment of this invention.

The topology information table 125 shown in FIG. 10 is for when the host 120 receives a pair forming command to form a new pair having the VOL 110 "0002" as the primary VOL and the VOL 110 "0001" as the secondary VOL in FIG. 1.

In the computer system shown in FIG. 1, the pair information tables 205 of the storage systems 100 before the host 120 receives the pair forming command are as shown in FIGS. 3 to 5. At this point, the topology information table 125 of the host 120 is as shown in FIG. 6.

Receiving the pair forming command, the host 120 has the command receiving processing executed by the command receiving program 123 as shown in FIG. 7. The received information contains "#22" and "0002" as the storage system number and the VOL number, respectively, of the primary VOL of the pair to be newly formed, and "#10" and "0001" as the storage system number and the VOL number, respectively, of the secondary VOL of the new pair.

The topology information creating processing (702 and the steps of FIG. 8) is started next. The received pair information is added to the topology information table 125. The topology information table 125 at this point is shown in FIG. 10. "#22" and "0002" are stored as the storage system number 611 and the VOL number 612, respectively, of the primary VOL information 610, and "#10" and "0001" are stored as the storage system number 621 and the VOL number 622, respectively, of the secondary VOL information 620 (row 603).

A loop check is started next (803 and the steps of FIG. 9). At this point, the VOL 110 "0001" of the storage system 100 "#10" is the current VOL (902).

A row 601 of FIG. 10 is an entry in which the current VOL is set as a primary VOL (903). The secondary VOL information 620 in the row 601 does not match the primary VOL of the received pair information (906), and therefore the secondary VOL of the row 601 is set as a new current VOL (908).

This makes a row 602 an entry in which the current VOL is set as a primary VOL (903). Since the secondary VOL information 620 in the row 602 matches the primary VOL of the received pair information (906), it is judged that a loop of pairs will be formed (907) and the loop check is ended abnormally (909).

As a result, the row 603 is deleted from the topology information table 125 (805), the pair forming command is rejected (705), and the command receiving processing is ended (706).

In the above example of this embodiment, the single host 120 alone has the command receiving program 123, the topology information creating program 124, and the topology information table 125 as shown in FIG. 1. However, this embodiment can be carried out also when plural hosts each have the command receiving program 123.

Figure 11:
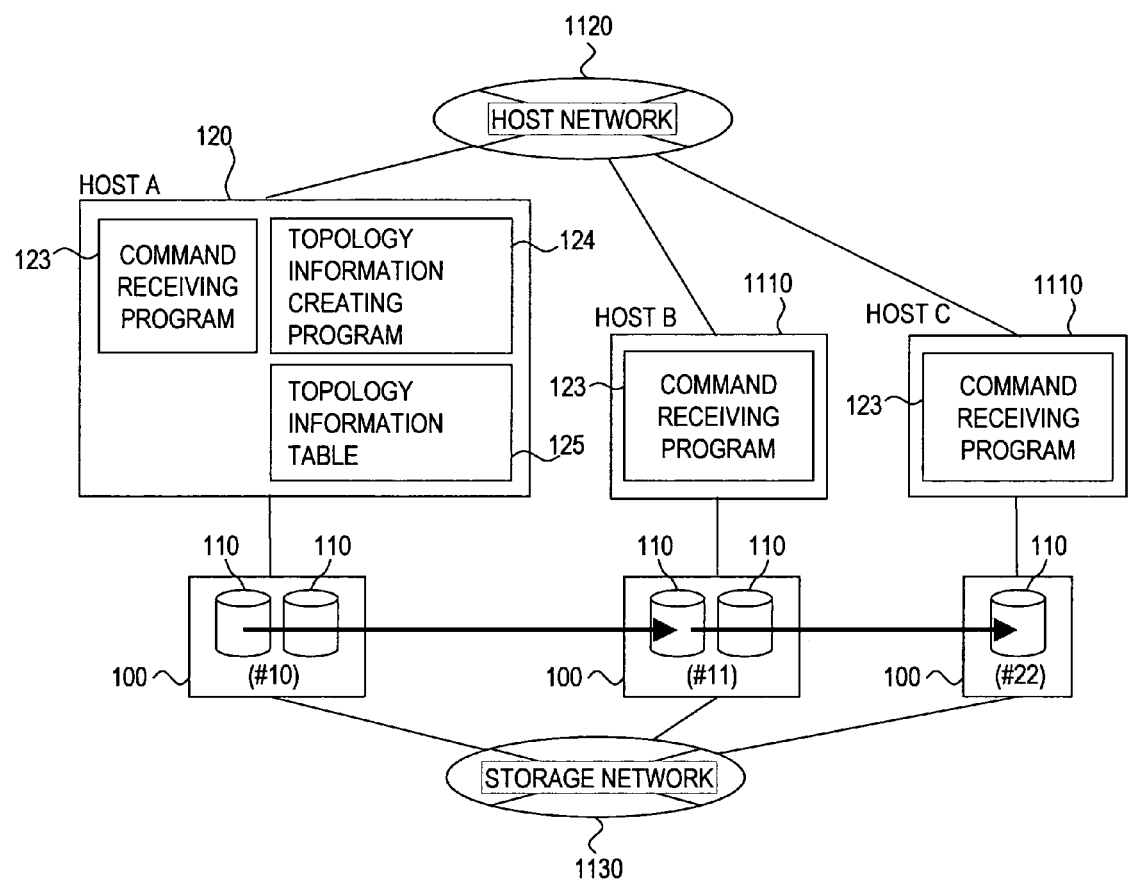
FIG. 11 is a block diagram of the configuration of another computer system according to the first embodiment of this invention where plural hosts have command receiving programs.

FIG. 11 is a block diagram of the configuration of a computer system according to the first embodiment of this invention where plural hosts each have the command receiving program 123.

The computer system of FIG. 11 is composed of three storage systems 100 and three hosts connected to the respective storage systems.

The three storage systems 100 are interconnected by a storage network 1130. The storage network 1130 is, for example, a SAN. Each storage system 100 has the configuration shown in FIG. 2, except that one of the plural host adapters 201 is connected to the relevant host and another is connected to the storage network 1130.

The three hosts are interconnected by a host network 1120. The host network 1120 is, for example, an IP network such as a LAN.

One of the three hosts is the host 120 (a host A in FIG. 11), which has the command receiving program 123, the topology information creating program, 124 and the topology information table 125. The configuration of the host 120 is as shown in FIG. 1. The remaining two of the three hosts are hosts 1110 (a host B and a host C in FIG. 11), each of which has the command receiving program 123 but not the topology information creating program 124 nor the topology information table 125. The hosts 1110 have a hardware configuration similar to that of the host 120, except that the topology information creating program 124 and the topology information table 125 are not stored in the MS 122 of each host 1110.

The command receiving program 123 of the host 120 or of each host 1110 can issue, to the storage system 100 that is connected to its host, a pair forming instruction to form a pair with a VOL 110 in this storage system 100 as the primary VOL.

The command receiving program 123 of the host 120 and the command receiving program 123 of each host 1110 execute the command receiving processing shown in FIG. 7.

However, the command receiving program 123 of each host 1110 calls up the topology information creating program 124 of the host 120 via the host network 1120 in the step 702 of FIG. 7 to have the topology information creating processing of FIGS. 8 and 9 executed by the program 124. A pair can be formed only when it is judged that a loop of pairs will not be formed.

FIG. 11 shows only three hosts, but this embodiment can have an arbitrary number of hosts if only one of the plural hosts serves as the host 120, which has the command receiving program 123, the topology information creating program 124, and the topology information table 125 while each of the rest serves as the host 1110, which does not have the topology information creating program 124 and the topology information table 125.

According to the first embodiment described above, topology information of every pair formed in one computer system is stored in one topology information table. Upon reception of a pair forming command which requests a new pair to be formed, the host 120 or another host judges from the topology information whether or not formation of the requested pair results in forming a loop of pairs. The requested pair is formed only when it is confirmed that a loop of pairs will not be formed. As a result, formation of a loop of pairs can be avoided irrespective of whether the system administrator has a grip on information of all the pairs or not.

Next, a second embodiment of this invention will be described with reference to the drawings.

In the first embodiment of this invention, the host 120 holds topology information and judges whether a loop of pairs will be formed or not. In the second embodiment, no host holds topology information and judges whether a loop of pairs will be formed. Instead, each storage system judges whether or not there is a possibility that a loop of pairs will be formed and, when there is, rejects to form the pair. In the following description of this embodiment, parts that are similar to those in the first embodiment of this invention shown in FIGS. 1 to 11 will not be described in detail.

Figure 12:
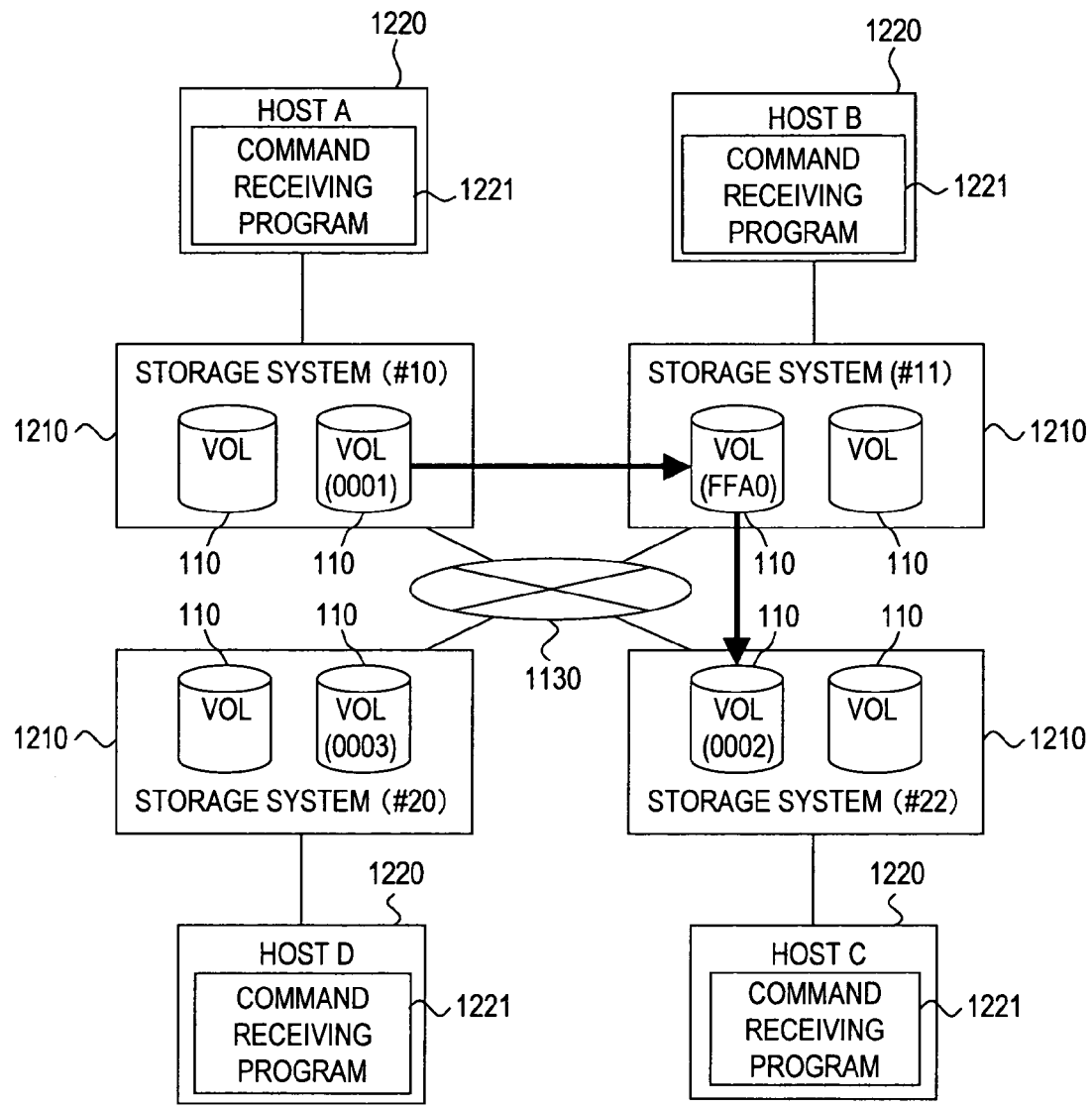
FIG. 12 is a block diagram showing a configuration of a computer system according to a second embodiment of this invention.

FIG. 12 is a block diagram showing the configuration of a computer system according to the second embodiment of this invention.

The computer system of this embodiment comprises plural storage systems 1210 interconnected by a storage network 1130, and plural hosts 1220 connected to the respective storage systems 1210. FIG. 12 shows four storage systems 1210 as well as four hosts 1220 connected to the storage systems 1210 on a one-on-one basis, but the computer system of this embodiment may have more than four storage systems 1210 and hosts 1220.

The configuration of each storage system 1210 will be described later in detail with reference to FIG. 13. Each storage system 1210 comprises one or more VOLs 110 as does the storage system 100 of the first embodiment. The VOLs 110 form pairs similar to those in the first embodiment.

The hardware configuration of each host 1220 is the same as that of the host 120 of the first embodiment shown in FIG. 1, except that the MS 122 of each host 1220 stores a command receiving program 1221 but not the topology information creating program 124 and the topology information table 125.

The command receiving program 1221 is a program that receives, from a system administrator or a user, a pair forming command requesting a new pair to be formed, and instructs the storage system 1210 to form the requested pair. A pair forming instruction issued by the command receiving program 1221 contains the storage system number of the storage system where the primary VOL of the requested pair (in other words, the pair to be formed) is located, the VOL number of this primary VOL, the storage system number of the storage system where the secondary VOL of the requested pair is located, and the VOL number of this secondary VOL. The pair forming instruction is issued from the host 1220 to the storage system 1210 where the primary VOL of the requested pair is located.

Figure 13:
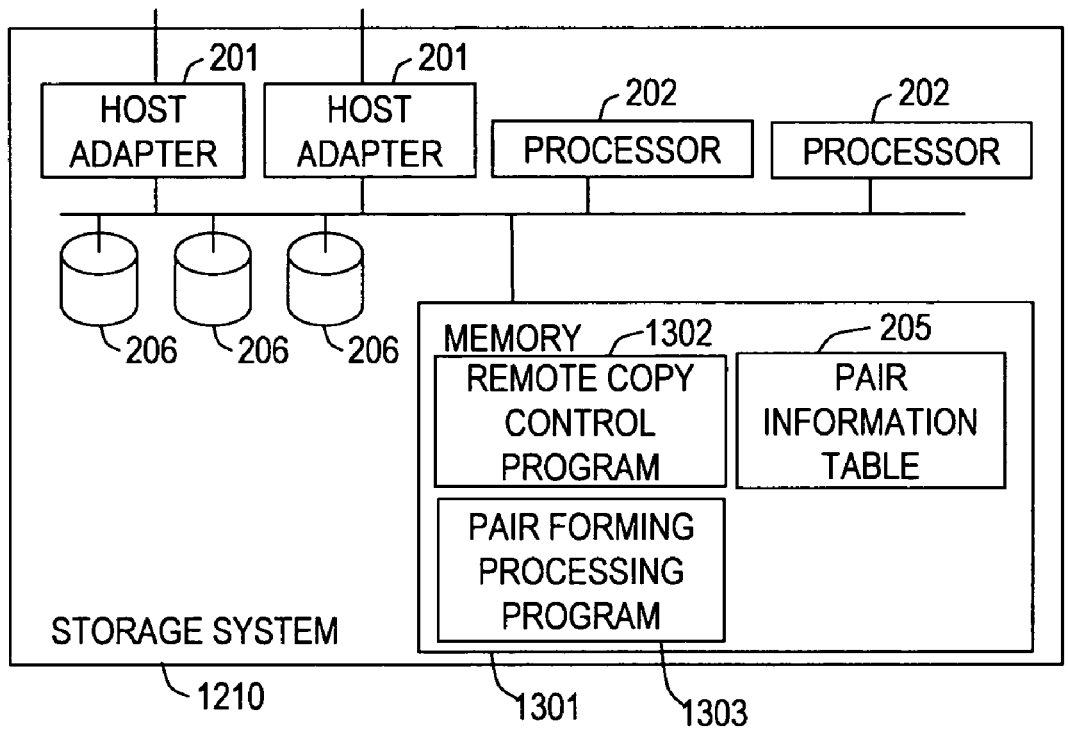
FIG. 13 is a block diagram showing a configuration of a storage system according to the second embodiment of this invention.

FIG. 13 is a block diagram showing the configuration of the storage system 1210 according to the second embodiment of this invention.

The storage system 1210 of this embodiment comprises one or more host adapters 201, one or more processors 202, a memory 1301, and one or more disk drives 206. Of these components, the host adapter 201, the processor 202 and the disk drive 206 are the same as those in the first embodiment, and descriptions thereof will be omitted here.

The memory 1301 is, for example, a semiconductor memory and stores programs executed by the processor 202 and other data. The memory 1301 of this embodiment stores, at least, a remote copy control program 1302, a pair forming processing program 1303, and the pair information table 205.

The pair information table 205 is the same as the one in the first embodiment and therefore a detailed description thereof is omitted here. In the case where the volumes are paired as shown in FIG. 12, the pair information tables 205 of the respective storage systems 1210 are as shown in FIGS. 3 to 5.

The remote copy control program 1302 and the pair forming processing program 1303 will be described later in detail.

Figure 14:
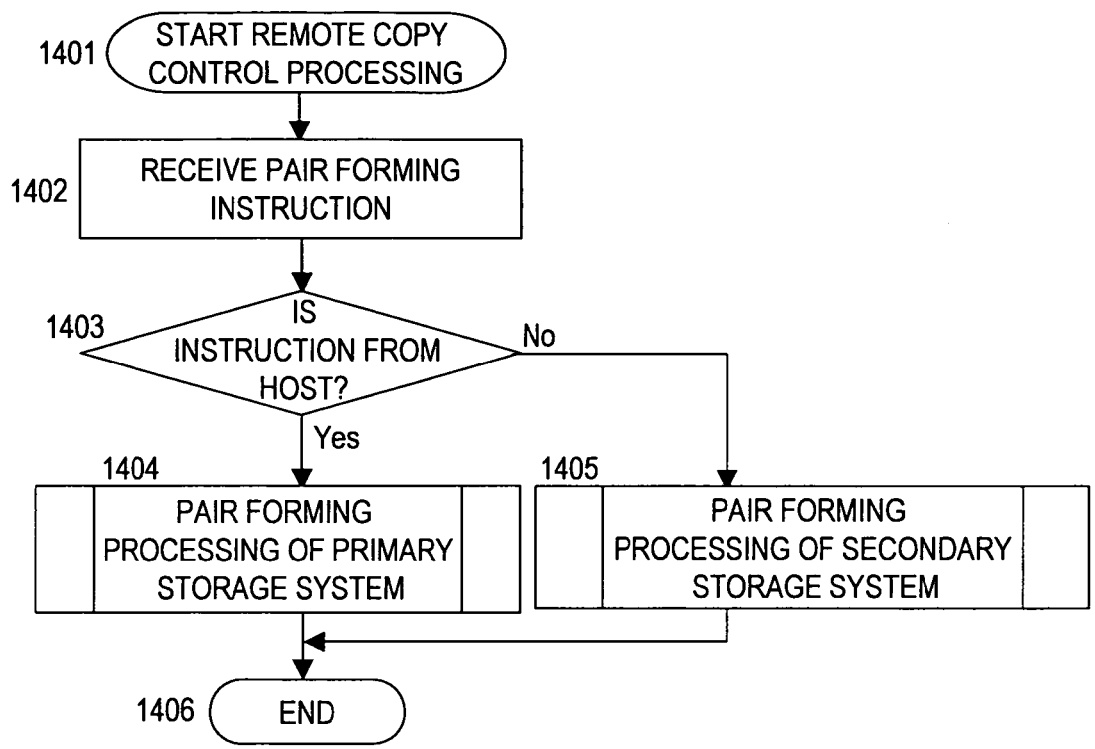
FIG. 14 is a flow chart of remote copy control processing according to the second embodiment of this invention.

FIG. 14 is a flow chart of remote copy control processing according to the second embodiment of this invention.

The remote copy control processing is executed by the remote copy control program 1302 when the storage system 1210 receives a pair forming instruction or other instructions from the host 1220 or from another storage system 1210. The following description is about processing for when the storage system 1210 receives a pair forming instruction. When other instructions than a pair forming instruction are received, the remote copy control program 1302 executes instructed processing (a description of which is omitted).

As the remote copy control processing is started (1401) and a pair forming instruction is received (1402), the remote copy control program 1302 judges whether or not the received pair forming instruction has been issued from the host 1220 (1403).

In the case where it is judged in the step 1403 that the received pair forming instruction has been issued from the host 1220, the storage system 1210 that has received the pair forming instruction serves as the primary storage system. In other words, a VOL 110 that is to serve as the primary VOL of the requested pair is located in the storage system that has received the pair forming instruction. Then the remote copy control program 1302 calls up the pair forming processing program 1303 to have pair forming processing of the primary storage system executed by the program 1303 (1404). Pair forming processing of a primary storage system will be described later with reference to FIG. 15.

On the other hand, when it is judged in the step 1403 that the received pair forming instruction has not been issued from the host 1220, it means that another storage system 1210 has issued the pair forming instruction. In this case, the storage system 1210 that has received the pair forming instruction serves as the secondary storage system of the requested pair. In other words, a VOL 110 that is to serve as the secondary VOL of the requested pair is located in the storage system that has received the pair forming instruction. Then the remote copy control program 1302 calls up the pair forming processing program 1303 to have pair forming processing of the secondary storage system executed by the program 1303 (1405). Pair forming processing of a secondary storage system will be described later with reference to FIG. 16.

As the step 1404 or 1405 is finished, the remote copy control processing is ended (1406).

Figure 15:
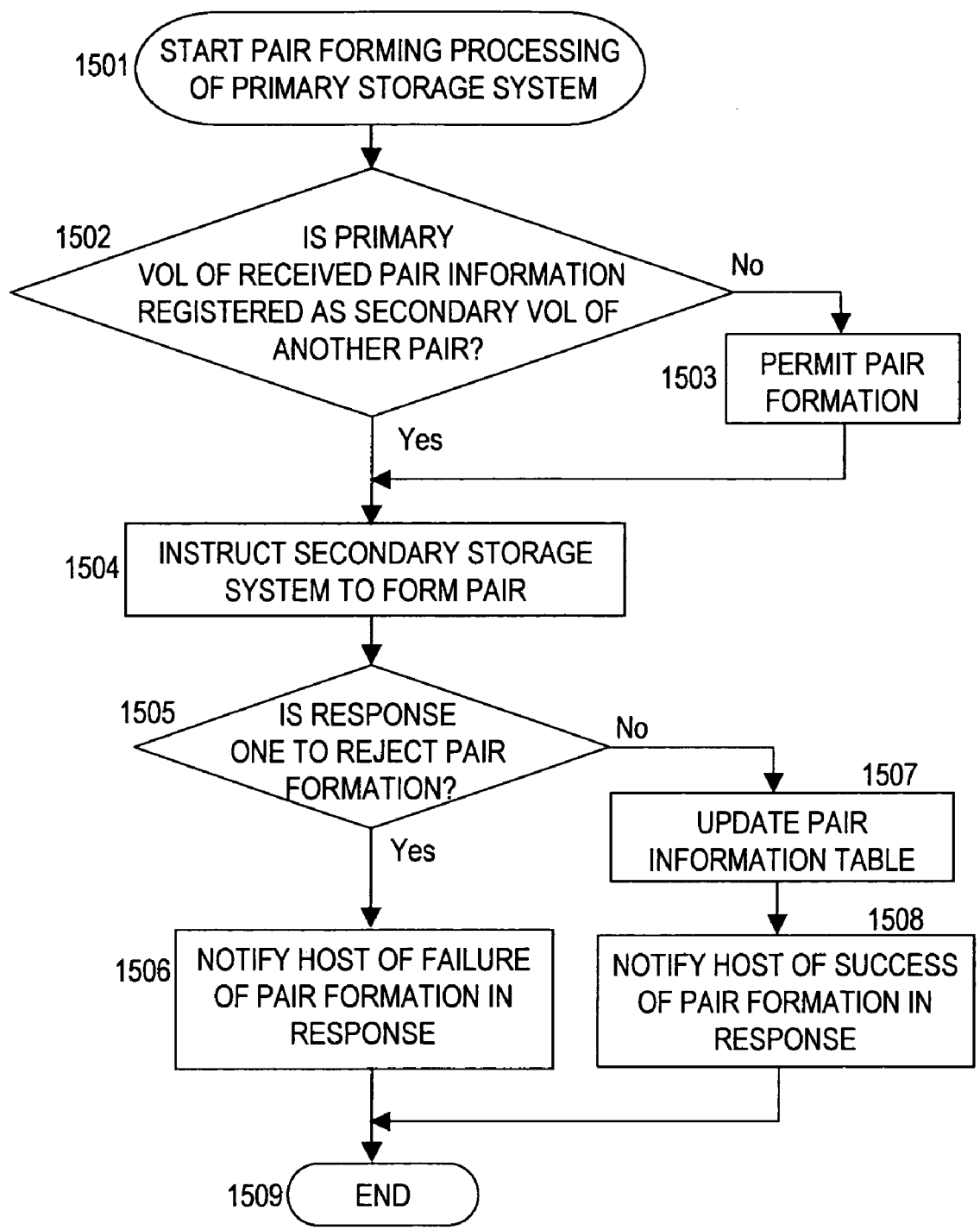
FIG. 15 is a flow chart of pair forming processing of a primary storage system according to the second embodiment of this invention.
Figure 16:
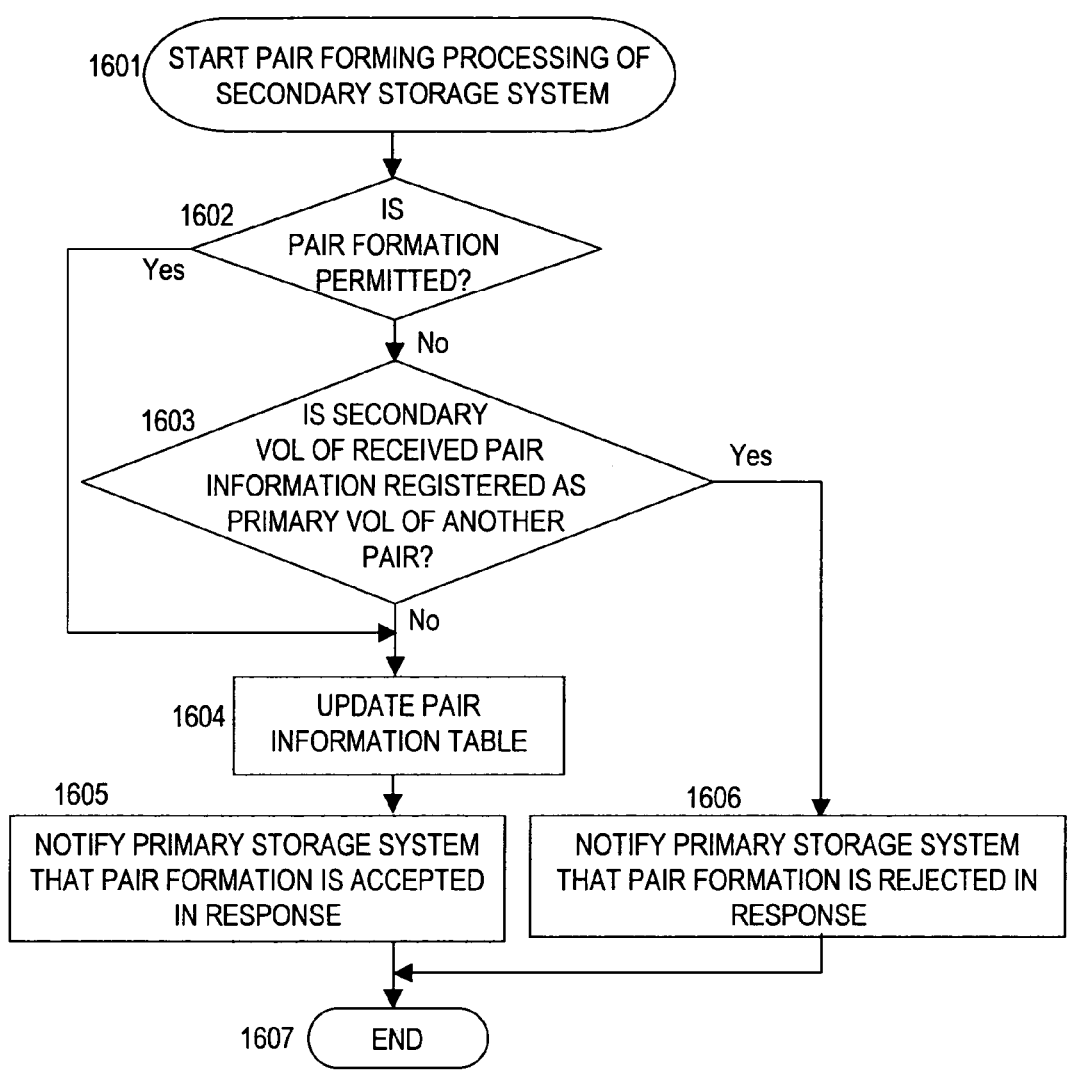
FIG. 16 is a flow chart of pair forming processing of a secondary storage system according to the second embodiment of this invention.

Described next with reference to FIGS. 15 and 16 is the operation of the pair forming processing program 1303. The pair forming processing program 1303 judges whether or not there is a possibility that a loop of pairs will be formed by executing a requested pair formation, and executes the requested pair formation only when there is no possibility that a loop of pairs will be formed. Specifically, when the primary VOL of received pair information is the secondary VOL of an existing pair and the secondary VOL of the received pair information is the primary VOL of an existing pair, the pair forming processing program 1303 judges that there is a possibility that a loop of pairs will be formed, and does not execute the requested pair formation. In other cases than this, the pair forming processing program 1303 judges that there is no possibility of forming a loop of pairs, and executes the requested pair formation.

FIG. 15 is a flow chart of pair forming processing of a primary storage system according to the second embodiment of this invention.

The pair forming processing of a primary storage system is executed by the pair forming processing program 1303, which is called up by the remote copy control program 1302 (step 1404 of FIG. 14).

As the pair forming processing of a primary storage system is started (1501), the pair forming processing program 1303 judges whether or not the primary VOL of the received pair information is registered as a secondary VOL in any of existing pairs (1502). Specifically, the pair forming processing program 1303 searches the pair information table 205 for an entry whose secondary VOL information 320 matches the primary VOL information contained in the received pair information and, when such an entry is found, the pair forming processing program 1303 judges that the primary VOL of the received pair information is registered as a secondary VOL in an existing pair.

When it is judged in the step 1502 that the primary VOL of the received pair information is registered as a secondary VOL in none of existing pairs, there is no possibility that a loop of pairs will be formed by executing the requested pair formation. Then the pair forming processing program 1303 sets a parameter (not shown) indicating that pair formation is permitted (1503), and issues a pair forming instruction to the secondary storage system where the secondary VOL of the received pair information is located (1504).

The parameter set in the step 1503 is attached to the pair forming instruction issued in the step 1504 to the secondary storage system.

On the other hand, when it is judged in the step 1502 that the primary VOL of the received pair information is registered as a secondary VOL in an existing pair, there may be or may not be a possibility that a loop of pairs will be formed. Accordingly, the pair forming processing program 1303 issues a pair forming instruction to the secondary storage system without setting a parameter indicating that pair formation is permitted (504).

Receiving the pair forming instruction of the step 1504, the secondary storage system executes processing, which will be described later in detail with reference to FIG. 16.

The pair forming processing program 1303 next judges whether or not a response from the secondary storage system is a rejection of the pair forming instruction (1505).

When it is judged in the step 1505 that the response is a rejection of the pair forming instruction, the requested pair formation cannot be executed. Then the pair forming processing program 1303 notifies the host 1220 of the failure in forming the pair (1506), and ends the processing (1509).

On the other hand, when it is judged in the step 1505 that the response is not a rejection of the pair forming instruction, the requested pair formation can be executed. Then the pair forming processing program 1303 updates the pair information table 205 (1507). Specifically, the pair forming processing program 1303 adds the received pair information as a new entry to the pair information table 205. As a result, the requested pair is formed.

Next, the pair forming processing program 1303 notifies the host 1220 of the success in forming the pair (1508), and ends the processing (1509).

FIG. 16 is a flow chart of pair forming processing of a secondary storage system according to the second embodiment of this invention.

The pair forming processing of a secondary storage system is executed by the pair forming processing program 1303 called up by the remote copy control program 1302 (step 1405 of FIG. 14). Specifically, the remote copy control program 1302 of the secondary storage system that has received the pair forming instruction of the step 1504 of FIG. 15 executes the remote copy control processing shown in FIG. 14. In the step 1403, it is judged that the instruction is not from the host 1220 and, in the step 1405, the pair forming processing of the secondary storage system is called up.

As the pair forming processing of the secondary storage system is started (1601), the pair forming processing program 1303 judges whether or not the primary storage system has allowed the pair to be formed (1602). Specifically, the pair forming processing program 1303 judges that the primary storage system has allowed the pair to be formed when a parameter indicating permission to form a pair is attached to the received pair forming instruction.

In the case where it is judged in the step 1602 that the primary storage system has allowed the pair to be formed, there is no possibility that a loop of pairs will be formed. Then the pair forming processing program 1303 executes the requested pair formation. Specifically, the received pair information is added as a new entry to the pair information table 205 (1604). The pair forming processing program 1303 notifies the primary storage system that the pair forming instruction has been accepted (1605), and ends the processing (1607).

On the other hand, when it is judged in the step 1602 that the primary storage system has not allowed the pair to be formed, the pair forming processing program 1303 judges whether or not the secondary VOL of the received pair information is registered as a primary VOL in any of existing pairs (1603). Specifically, the pair forming processing program 1303 searches the pair information table 205 for an entry whose primary VOL information 310 matches the secondary VOL information contained in the received pair information and, when such an entry is found, the pair forming processing program 1303 judges that the secondary VOL of the received pair information is registered as a primary VOL in an existing pair.

When it is judged in the step 1603 that the secondary VOL of the received pair information is registered as a primary VOL in none of existing pairs, there is no possibility that a loop of pairs will be formed. Then the processing moves to the step 1604.

On the other hand, when it is judged in the step 1603 that the secondary VOL of the received pair information is registered as a primary VOL in an existing pair, there is a possibility that a loop of pairs will be formed. Accordingly, the pair forming processing program 1303 notifies the primary storage system that the pair forming instruction is rejected (1606), and ends the processing (1607).

Next, specific examples of the second embodiment of this invention will be described with reference to FIGS. 12 to 16.

A case of forming a new pair that has the VOL 110 "0002" of the storage system 1210 "#22" as the primary VOL and the VOL 110 "0001" of the storage system 1210 "#10" as the secondary VOL in FIG. 12 is described first. In this case, the command receiving program 1221 of the host C receives a pair forming request command and issues a pair forming instruction to the storage system 1210 "#22".

The remote copy control program 1302 of the storage system 1210 "#22" (the primary storage system) receives the pair forming instruction from the host C (1403) and calls up the pair forming processing of the primary storage system (1404).

Since the primary VOL of the received pair information (namely, the VOL 110 "0002") is registered as a secondary VOL in an existing pair (1502), the pair forming processing program 1303 of the primary storage system issues a pair forming instruction to the secondary storage system (namely, the storage system 1210 "#10") (1504).

The pair is not allowed to be formed (1602), and the secondary VOL of the received pair information (namely, the VOL 110 "0001") is registered as a primary VOL in an existing pair (1603). Therefore, the pair forming processing program 1303 of the secondary storage system sends, in response, to the primary storage system, a message saying that the pair forming instruction has been rejected (1606).

With the response from the secondary storage system being a rejection of the pair forming instruction (1505), the pair forming processing program 1303 of the primary storage system notifies the host C of the failure in forming the pair (1506). As a result, the requested pair is not formed.

A case of forming a new pair that has the VOL 110 "0002" of the storage system 1210 "#22" as the primary VOL and the VOL 110 "0003" of the storage system 1210 "#20" as the secondary VOL in FIG. 12 is described next. In this case, pair forming processing of a secondary storage system is the same as the one described above up through the step 1602.

In the step 1603, the secondary VOL of the received pair information (namely, the VOL 110 "0003") is registered as a primary VOL in none of existing pairs. Therefore, the pair forming processing program 1303 of the secondary storage system adds the received pair information as a new entry to the pair information table 205 (1604), and sends, in response, to the primary storage system, a message saying that the pair forming instruction has been accepted (1605).

With the response from the secondary storage system not being a rejection of the pair forming instruction (1505), the pair forming processing program 1303 of the primary storage system adds the received pair information as a new entry to the pair information table 205 (1507), and notifies the host C of the success in forming the pair (1508). As a result, the requested pair is formed.

According to the second embodiment of this invention described above, the storage system 1210 that has received an instruction to form a new pair consults the pair information table 205. In the case where the primary VOL of the pair to be formed is registered as a secondary VOL in any of existing pairs and the secondary VOL of the pair to be formed is registered as a primary VOL in any of existing pairs, there is a possibility that a loop of pairs will be formed and therefore the pair formation is rejected. As a result, formation of a loop of pairs can be avoided without needing the system administrator nor the host to have a grip on the topology of every pair.

A third embodiment of this invention will be described next with reference to the drawings.

The third embodiment is similar to the second embodiment in that each storage system judges whether or not there is a possibility that a loop of pairs will be formed and, if there is, rejects to form a pair. Specifically, a pair ID, which will be described later, is assigned to each VOL 110 and is consulted to judge whether or not there is a possibility that a loop of pairs will be formed. In the following description of this embodiment, parts that are similar to those in the first and second embodiments of this invention shown in, e.g., FIGS. 1 and 12 will not be described in detail.

Figure 17:
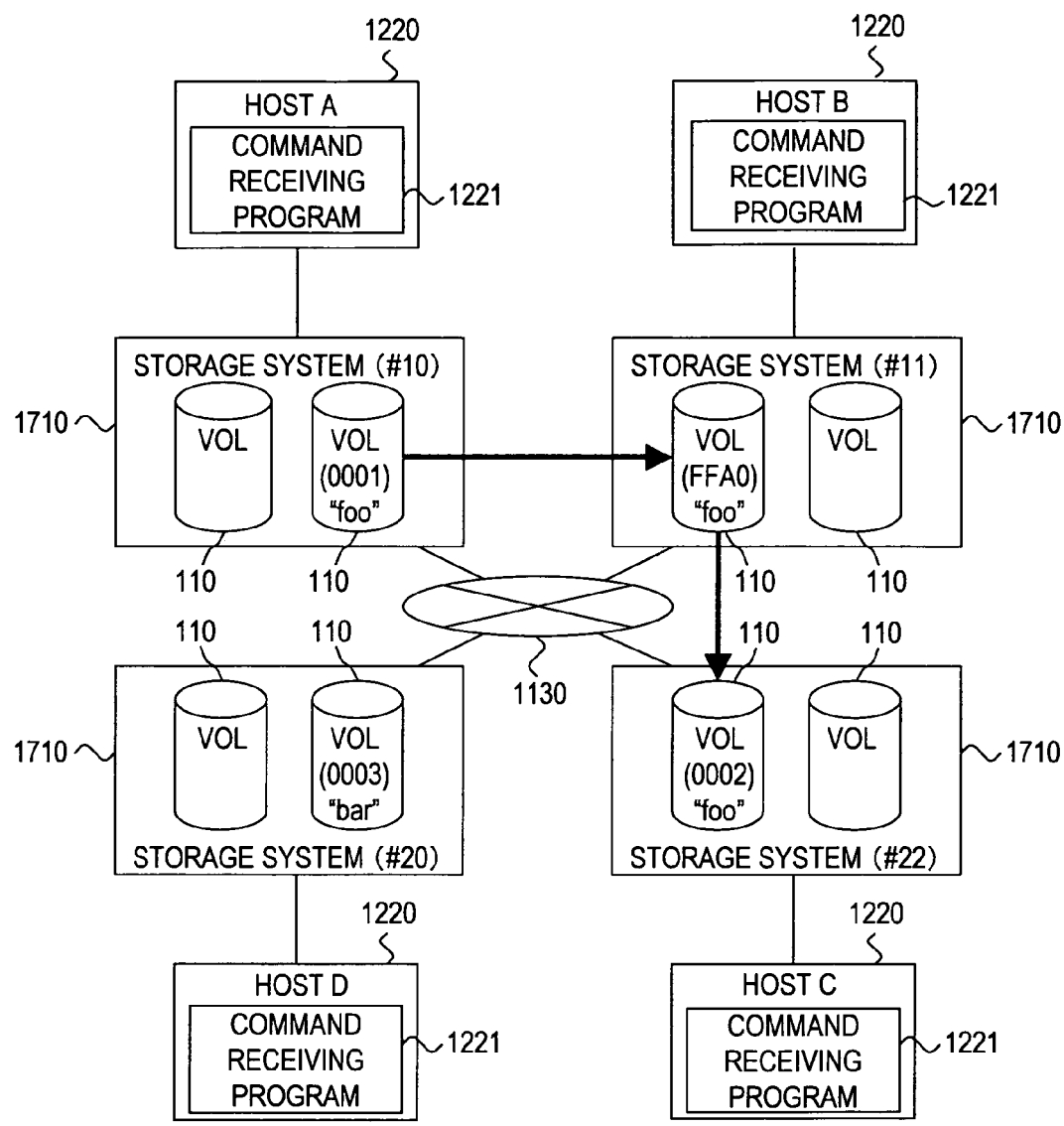
FIG. 17 is a block diagram showing a configuration of a computer system according to a third embodiment of this invention.

FIG. 17 is a block diagram showing the configuration of a computer system according to the third embodiment of this invention.

The computer system of this embodiment comprises plural storage systems 1710 interconnected by a storage network 1130, and plural hosts 1220 connected to the respective storage systems 1710. FIG. 17 shows four storage systems 1710 as well as four hosts 1220 connected to the storage systems 1710 on a one-on-one basis, but the computer system of this embodiment may have more than four storage systems 1710 and hosts 1220.

The configuration of each storage system 1710 will be described later in detail with reference to FIG. 18. Each storage system 1710 has one or more VOLs 110 as does the storage system 1210 of the second embodiment. Of these VOLs 110, the VOLs 110 "0001", "FFA0" and "0002" form pairs similar to those in the second embodiment. The VOL 110 "0003" is paired with another VOL 110 (not shown). In this embodiment, a pair ID, which will be described later, is assigned to each VOLs 110 that belongs to a pair. In the example of FIG. 17, the VOLs 110 "0001", "FFA0" and "0002" are given a pair ID "foo" whereas the VOL 110 "0003" is given a pair ID "bar".

The configuration of each host 1220 is the same as in the first embodiment, and a description thereof is omitted here.

Figure 18:
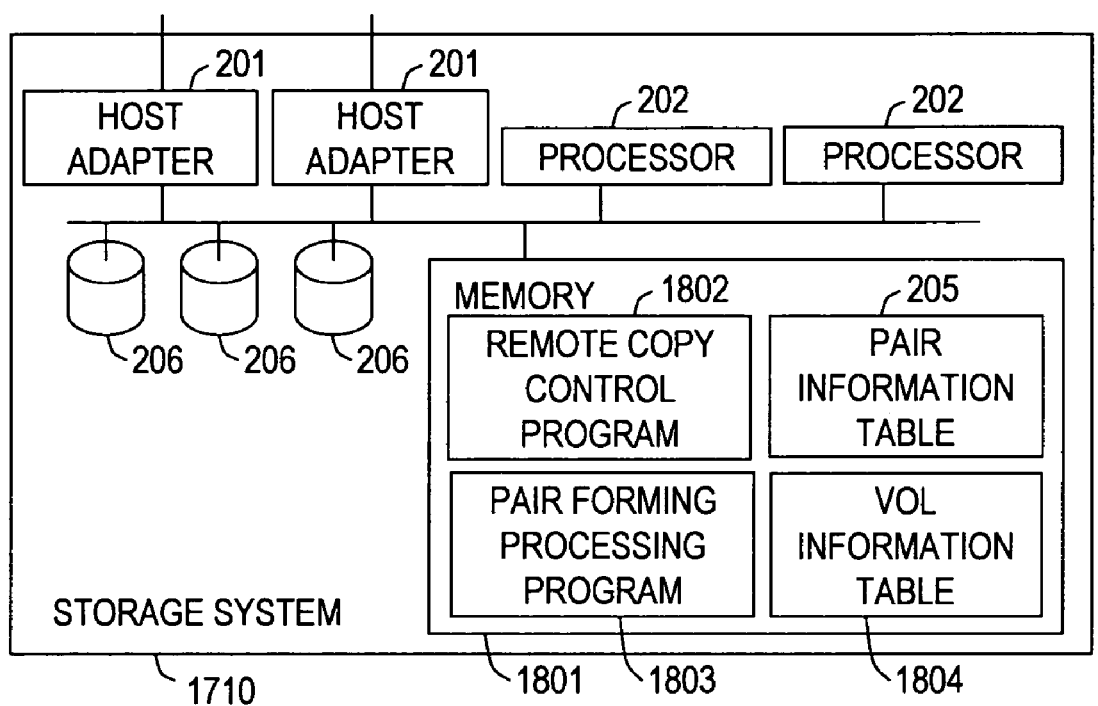
FIG. 18 is a block diagram showing a configuration of a storage system according to the third embodiment of this invention.

FIG. 18 is a block diagram showing the configuration of the storage system 1710 according to the third embodiment of this invention.

The storage system 1710 of this embodiment is composed of one or more host adapters 201, one or more processors 202, a memory 1801, and one or more disk drives 206. Of these components, the host adapter 201, the processor 202 and the disk drive 206 are the same as those in the first and second embodiments, and descriptions thereof will be omitted here.

The memory 1801 is, for example, a semiconductor memory and stores programs executed by the processor 202 and other data. The memory 1801 of this embodiment stores, at least, a remote copy control program 1802, a pair forming processing program 1803, the pair information table 205, and a VOL information table 1804. The pair information table 205 is the same as the ones in the first and second embodiments and therefore a description thereof is omitted here. The pair forming processing program 1803 and the VOL information table 1804 will be described later in detail.

FIG. 19 is an explanatory diagram of the VOL information table 1804 according to the third embodiment of this invention.

The VOL information table 1804 of each storage system 1710 holds information of VOLs 110 that the storage system 1710 has. In the case where a VOL 110 belongs to a pair, the identifier of the pair (pair ID) is contained in information to be stored in the VOL information table 1804.

The VOL information table 1804 is composed of, at least, a VOL number 1911, a format 1912, a capacity 1913 and a pair ID 1914. The VOL information table 1804 may also contain other information about each VOL 110 (for example, information indicating the state of a pair to which the VOL 110 belongs, or information indicating whether the VOL 111 is a primary VOL or a secondary VOL). One row (entry) of the VOL information table 1804 holds information of one VOL 110.

FIG. 19 shows, as an example, the VOL information table 1804 of the storage system 1710 "#10". Of the VOLs 110 in the storage system 1710 "#10", the VOL 110 "0001" is the only one whose entry is shown in FIG. 19 (row 1901), and the rest of the entries are omitted from the drawing.

The VOL number 1911 represents a number assigned to each VOL 110 for identification, and corresponds to the VOL numbers 312, 322, 612 and 622. In the example of FIG. 19, the VOL number "0001" of the VOL 110 "0001" is entered as the VOL number 1911.

The format 1912 indicates the format of each VOL 110. In the example of FIG. 19, "Open-3" is entered as the format 1912 for the VOL 110 "0001".

The capacity 1913 indicates the storage capacity of each VOL 110. In the example of FIG. 19, 3 GB is entered as the capacity 1913 for the VOL 110 "0001".

The pair ID 1914 is the identifier of a pair to which each VOL 110 belongs. When a new pair is formed by a system administrator or a user, the system administrator or the user sets an arbitrary value as the pair ID 1914. However, in the case where the pair ID 1914 has already been set to the primary VOL of the pair to be newly formed, the set value is used as the pair ID 1914 of the pair to be newly formed. How the pair ID 1914 is set will be described later in detail.

As shown in FIG. 17, the VOL 110 "0001" of the storage system 1710 "#10" belongs to a pair whose pair ID is "foo". Accordingly, "foo" is entered as the pair ID 1914 in FIG. 19.

Drawings of the VOL information tables 1804, 1804, 1804 . . . of the other storage systems 1710, 1710, 1710 . . . are omitted. The pair ID 1914 assigned to the VOL 110 "FFA0" of the storage system 1710 "#11" is "foo". The pair ID 1914 assigned to the VOL 110 "0002" of the storage system 1710 "#22" is "foo". The pair ID 1914 assigned to the VOL 110 "0003" of the storage system 1710 "#20" is "bar".

An ineffective value is entered as the pair ID 1914 in an entry for a VOL 110 that does not belong to any pairs.

Remote copy control processing of this embodiment is executed by the remote copy control program 1802 when the storage system 1710 receives a pair forming instruction or other instructions from the host 1220 or from another storage system 1710. The remote copy control processing of this embodiment is similar to the remote copy processing of FIG. 14 according to the second embodiment of this invention, and a detailed description thereof is omitted here.

The difference is that, in this embodiment, a system administrator or the like who requests a new pair to be formed issues a pair forming command with a pair ID. The system administrator or the like can designate an arbitrary pair ID to be contained in the pair forming command. Thus, a pair ID is contained in a pair forming command received in this embodiment (step 1402 of FIG. 14).

Figure 20:
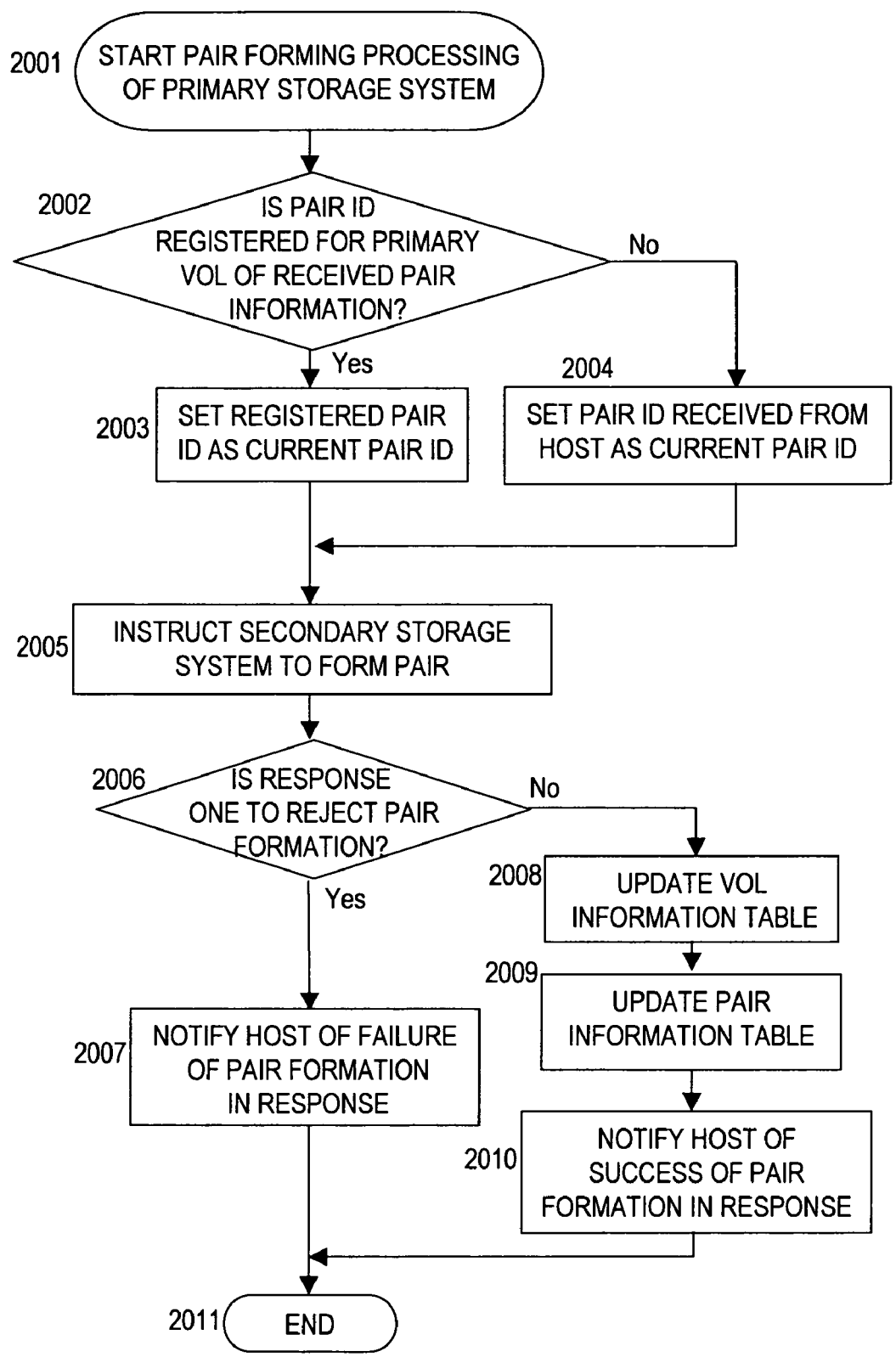
FIG. 20 is a flow chart of pair forming processing of a primary storage system according to the third embodiment of this invention.

FIG. 20 is a flow chart of pair forming processing of a primary storage system according to the third embodiment of this invention.

The pair forming processing of a primary storage system is executed by the pair forming processing program 1803, which is called up by the remote copy program 1802 (step 1404 of FIG. 14).

The pair forming processing program 1803 starts the pair forming processing of a primary storage system (2001), and judges whether or not a pair ID is registered for the primary VOL of received pair information (2002). Specifically, the pair forming processing program 1803 looks up the VOL information table 1804 to judge whether or not an effective value is registered as the pair ID 1914 for the primary VOL contained in the received pair information.

When it is judged in the step 2002 that a pair ID is registered for the primary VOL of the received pair information, the primary VOL belongs to an existing pair. In this case, the pair forming processing program 1803 sets the registered value of the pair ID 1914 as a current pair ID (2003). At this point, the pair ID designated by the system administrator or the like is ignored.

On the other hand, when it is judged in the step 2002 that no pair ID is registered for the primary VOL of the received pair information, the primary VOL belongs to none of existing pairs. In this case, the pair forming processing program 1803 sets, as a current pair ID, the pair ID received from the host 1220 (in other words, the pair ID arbitrarily set by the system administrator or the like) (2004).

Next, the pair forming processing program 1803 issues a pair forming instruction to the secondary storage system (2005). The instruction contains the current pair ID.

The pair forming processing program 1803 then judges whether or not a response from the secondary storage system is a rejection of the pair forming instruction (2006).

When it is judged in the step 2006 that the response is a rejection of the pair forming instruction, the requested pair formation cannot be executed. Then the pair forming processing program 1803 notifies the host 1220 of the failure in forming the pair (2007), and ends the processing (2011).

On the other hand, when it is judged in the step 2006 that the response is not a rejection of the pair forming instruction, the requested pair formation can be executed. Then the pair forming processing program 1803 updates the VOL information table 1804 (2008). Specifically, the pair forming processing program 1803 registers the value of the current pair ID as the pair ID 1914 in an entry of the VOL information table 1804 that is for the primary VOL of the received pair information. At this point, the value of the pair ID 1914 that has been registered prior to the update is deleted.

Next, the pair forming processing program 1803 updates the pair information table 205 (2009). Specifically, the pair forming processing program 1803 adds the received pair information as a new entry to the pair information table 205. As a result, the requested pair is formed.

The pair forming processing program 1803 next notifies the host 1220 of the success in forming the pair (2010), and ends the processing (2011).

Figure 21:
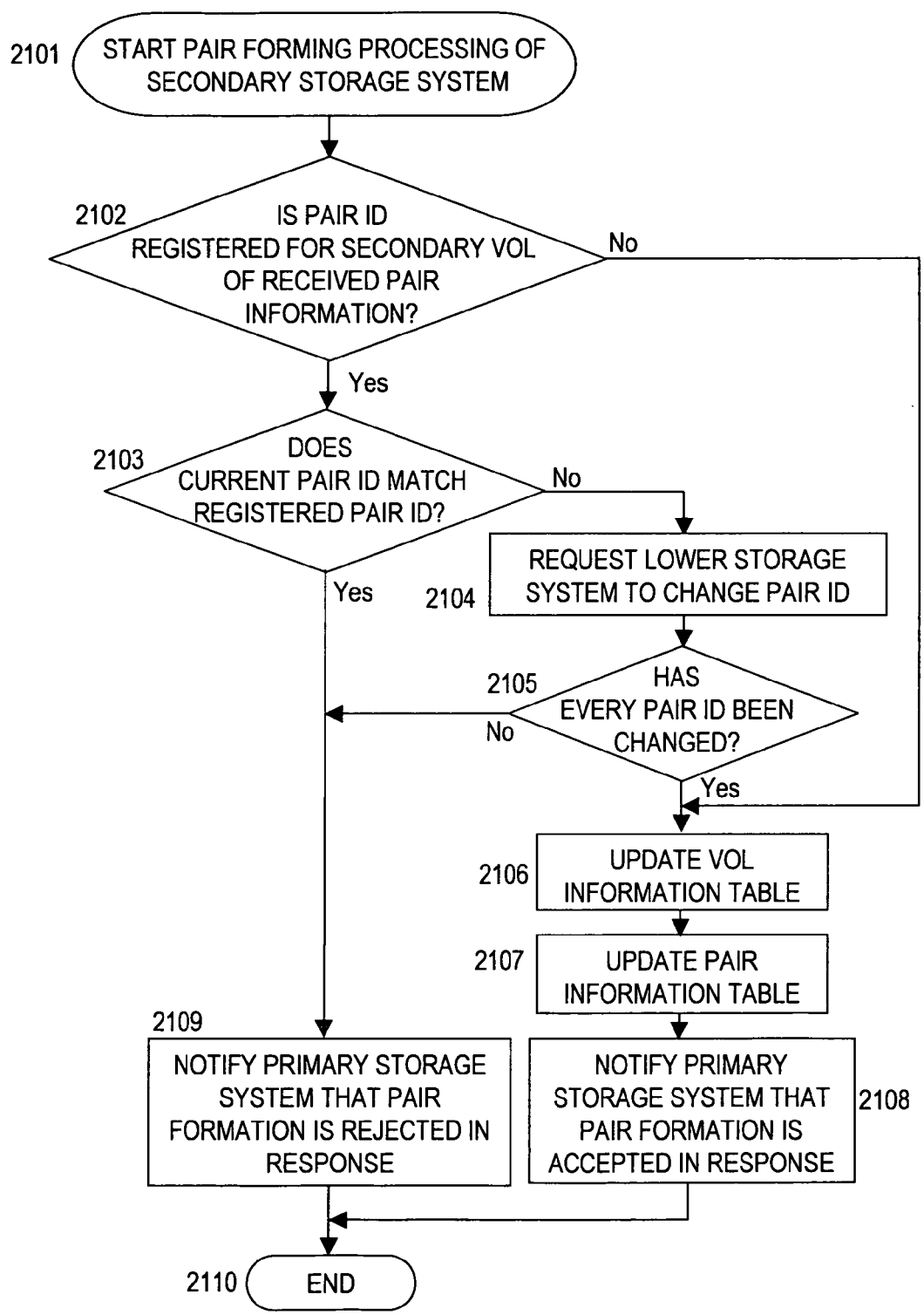
FIG. 21 is a flow chart of pair forming processing of a secondary storage system according to the third embodiment of this invention.

FIG. 21 is a flow chart of pair forming processing of a secondary storage system according to the third embodiment of this invention.

The pair forming processing of a secondary storage system is executed by the pair forming processing program 1803 called up by the remote copy control program 1802 (step 1405 of FIG. 14). Specifically, the remote copy control program 1802 of the secondary storage system that has received the pair forming instruction of the step 2005 of FIG. 20 executes the remote copy control processing shown in FIG. 14. In the step 1403, it is judged that the instruction is not from the host 1220 and, in the step 1405, the pair forming processing of the secondary storage system is called up.

The pair forming processing program 1803 starts the pair forming processing of a secondary storage system (2101), and judges whether or not a pair ID is registered for the secondary VOL of received pair information (2102). Specifically, the pair forming processing program 1803 looks up the VOL information table 1804 to judge whether or not an effective value is registered as the pair ID 1914 for the secondary VOL contained in the received pair information.

When it is judged in the step 2102 that no pair ID is registered for the secondary VOL of the received pair information, the secondary VOL does not belong to any existing pair. Accordingly, there is no possibility that a loop of pairs will be formed by executing the requested pair formation. In this case, the requested pair formation can be executed and therefore the processing moves to a step 2106, which will be described later.

On the other hand, when it is judged in the step 2102 that a pair ID is registered for the secondary VOL of the received pair information, the secondary VOL belongs to existing pairs. In this case, the pair forming processing program 1803 judges whether or not the received current pair ID (namely, the current pair ID that is contained in the pair forming instruction issued from the primary storage system) coincides with the pair ID registered for the secondary VOL (2103).

When it is judged in the step 2103 that the two pair IDs match, the primary VOL and secondary VOL of the received pair information (namely, the primary VOL and secondary VOL of the pair to be newly formed) belong to the same pair series. Executing this requested pair formation results in forming a loop of pairs. In this case, since the requested pair formation cannot be executed, the pair forming processing program 1803 rejects to form the pair and sends a message to that effect to the primary storage system (2109), and ends the processing (2110).

When it is judged in the step 2103 that the two pair IDs do not match, the primary VOL and secondary VOL of the received pair information do not belong to the same pair series. Accordingly, there is no possibility that a loop of pairs will be formed by executing the requested pair formation.

Then the requested pair formation can be executed. The pair forming processing program 1803 issues a request to change the pair ID 1914 for VOLs 110 that are lower than the secondary VOL of received pair information to the current pair ID, to the storage system 1710 where the lower VOLs 110 are located (2104).

Next, the pair forming processing program 1803 judges whether or not the pair ID 1914 has been changed in every storage system that is included in the series of the pair to be formed (2105).

When it is judged in the step 2105 that the pair ID 1914 has not been changed in every storage system that is included in the series of the pair to be formed, the requested pair formation cannot be executed. Then the pair forming processing program 1803 rejects to form the pair and sends a message to that effect to the primary storage system (2109), and ends the processing (2110).

On the other hand, when it is judged in the step 2105 that the pair ID 1914 has been changed in every storage system that is included in the series of the pair to be formed, the requested pair formation can be executed. Then the pair forming processing program 1803 updates the VOL information table 1804 (2106). Specifically, the value of the current pair ID is registered as the pair ID 1914 in an entry of the VOL information table 1804 that is for the secondary VOL of the received pair information. At this point, the value of the pair ID 1914 that has been registered prior to the update is deleted.

The pair forming processing program 1803 also updates the pair information table 205 (2107). Specifically, the received pair information is added as a new entry to the pair information table 205. As a result, the requested pair is formed.

The pair forming processing program 1803 then notifies the primary storage system that the pair forming instruction has been accepted (2108), and ends the processing (2110).

Next, specific examples of the third embodiment of this invention will be described with reference to FIGS. 17 to 21.

A case of forming a new pair that has the VOL 110 "0002" of the storage system 1710 "#22" as the primary VOL and the VOL 110 "0001" of the storage system 1710 "#10" as the secondary VOL in FIG. 17 is described first. In this case, the command receiving program 1221 of the host C receives a pair forming request command and issues a pair forming instruction to the storage system 1710 "#22".

The remote copy control program 1802 of the storage system 1710 "#22" (the primary storage system) receives the pair forming instruction from the host C (1403) and calls up the pair forming processing of the primary storage system (1404).

A pair ID "foo" is registered for the primary VOL of the received pair information (namely, the VOL 110 "0002") (2002), and therefore the pair forming processing program 1803 of the primary storage system sets "foo" as a current pair ID (2003). The pair forming processing program 1803 of the primary storage system then issues a pair forming instruction to the secondary storage system (namely, the storage system 1710 "#10") (2005).

Since "foo" is registered as the pair ID for the secondary VOL of the received pair information (namely, the VOL 110 "0001) (2102)", and the pair ID "foo" matches the current pair ID "foo" (2103), the pair forming processing program 1803 of the secondary storage system rejects to form the pair and sends a message to that effect to the primary storage system (2109).

With the response from the secondary storage system being a rejection of the pair forming instruction (2006), the pair forming processing program 1803 of the primary storage system notifies the host C of the failure in forming the pair (2007). As a result, the requested pair is not formed.

A case of forming a new pair that has the VOL 110 "0002" of the storage system 1710 "#22" as the primary VOL and the VOL 110 "0003" of the storage system 1710 "#20" as the secondary VOL in FIG. 17 is described next. In this case, pair forming processing of a secondary storage system is the same as the one described above up through the step 2102.

In the step 2103, the pair ID "bar" of the secondary VOL of the received pair information differs from the current pair ID "foo". Then the pair forming processing program 1803 of the secondary storage system issues an instruction to change the pair ID for VOLs 110, 110, 110 . . . that are lower than the secondary VOL of the received pair information (the lower volumes are not shown in FIG. 17) from "bar" to "foo", to the storage system 1710 where the lower VOLs 110, 110, 110 . . . are located (2104).

The storage system 1710 that has received this instruction changes the pair ID 1914 of the relevant VOL 110 from "bar" to "foo" in the VOL information table 1804.

After the pair ID of every lower VOL 110 is changed (2105), the pair forming processing program 1803 of the secondary storage system changes the pair ID 1914 of the secondary VOL of the received pair information from "bar" to "foo" in the VOL information table 1804 of the secondary storage system (2106). The pair forming processing program 1803 of the secondary storage system also adds the received pair information as a new entry to the pair information table 205 (2107), and sends, in response, to the primary storage system, a message saying that the pair forming instruction has been accepted (2108).

With the response from the secondary storage system not being a rejection of the pair forming instruction (2006), the pair forming processing program 1803 of the primary storage system updates the pair ID 1914 in the VOL information table 1804 with the value of the current pair ID (2008). In this example, the registered pair ID 1914 and the current pair ID are both "foo", and therefore the pair ID 1914 does not change through the update.

The pair forming processing program 1803 of the primary storage system also adds the received pair information as a new entry to the pair information table 205 (2009), and notifies the host C of the success in forming the pair (2010). As a result, the requested pair is formed.

According to the third embodiment of this invention described above, the storage system 1710 that has received an instruction to form a new pair consults the VOL information table 1804 to judge whether or not the pair ID 1914 that is assigned to the primary VOL of the pair to be formed matches the pair ID 1914 that is assigned to the secondary VOL of the pair to be formed. In the case where the two match, there is a possibility that a loop of pairs will be formed and therefore the formation of the pair is rejected. As a result, formation of a loop of pairs can be avoided without needing the system administrator nor the host to have a grip on the topology of every pair.

What is claimed is:

1. A method of controlling formation of a remote copy pair of logical volumes in a computer system comprising a plurality of storage systems including a plurality of logical volumes and a plurality of computers, each storage system being coupled to one of the computers, the method comprising:

receiving a request to form a remote copy pair;

judging whether or not said request is sent from one of said plurality of computers, judging whether or not a loop of remote copy pairs will be formed by executing the requested remote copy pair formation based on connection information to identify copy source and copy target logical volumes and storage systems of existing remote copy pairs that have been formed in the computer system; and executing the requested remote copy pair formation when it is judged that no loop of copy pairs will be formed, wherein each storage system of the plurality of storage systems includes at least one logical volume and the connection information, and wherein the connection information is consulted to find, from among the existing remote copy pairs, one that has, as its copy source logical volume, a copy target logical volume of the remote copy pair requested to be formed, or a logical volume that is below the copy target logical volume and, when such an existing remote copy pair is not found, it is judged that no loop of remote copy pairs will be formed.

2. The method according to claim 1, wherein, when it is judged that a loop of remote copy pairs will be formed, the requested remote copy pair formation is rejected.

3. The method according to claim 1, wherein, when the copy source logical volume of the remote copy pair requested to be formed does not serve as a copy target logical volume in any of the existing remote copy pairs that have been formed in the computer system, it is judged that no loop of remote copy pairs will be formed.

4. The method according to claim 1, wherein, when the copy target logical volume of the remote copy pair requested to be formed does not serve as a copy source logical volume in any of the existing remote copy pairs that have been formed in the computer system, it is judged that no loop of remote copy pairs will be formed.

5. The method according to claim 1, wherein, in the computer system, a pair identifier to identify a remote copy pair is registered for each of the logical volumes that belong to the remote copy pair, and wherein, when no pair identifier is registered for the copy target logical volume of the remote copy pair requested to be formed, it is judged that no loop of remote copy pairs will be formed.

6. The method according to claim 5, wherein a pair identifier to identify the remote copy pair requested to be formed is attached to the request to form a remote copy pair, and wherein the pair identifier attached to the request is registered as the pair identifier of the copy target logical volume.

7. The method according to claim 1, wherein, in the computer system, a pair identifier to identify a remote copy pair is registered for each of the logical volumes that belong to the remote copy pair, and wherein, when the pair identifier registered for the copy source logical volume of the remote copy pair requested to be formed differs from the pair identifier registered for the copy target logical volume of the remote copy pair requested to be formed, it is judged that no loop of remote copy pairs will be formed.

8. The method according to claim 7, wherein the pair identifier registered for the copy source logical volume is registered as the pair identifier of the copy target logical volume and a logical volume below the copy target logical volume.

9. The method according to claim 1, wherein, in the computer system, a pair identifier to identify a remote copy pair is registered for each of the logical volumes that belong to the remote copy pair, wherein a pair identifier to identify the remote copy pair requested to be formed is attached to the request to form a remote copy pair, and wherein, when no pair identifier is registered for the copy source logical volume of the remote copy pair requested to be formed, and the pair identifier attached to the request differs from the pair identifier registered for the copy target logical volume of the remote copy pair requested to be formed, it is judged that no loop of remote copy pairs will be formed.

10. The method according to claim 9, wherein the pair identifier attached to the request is registered as the pair identifier of the copy target logical volume and a logical volume below the copy target logical volume.

11. The method according to claim 1, further comprising:

judging whether or not the copy source logical volume of the received request is registered as a copy target logical volume in any of existing remote copy pairs, issuing a remote copy pair forming instruction to a secondary storage system where the copy target logical volume of the received request is located, if the copy logical source volume of the received request is registered as a copy source logical volume in none of existing pairs, issuing a remote copy pair forming instruction to a secondary storage system in existing remote copy pairs if the copy source logical volume of the received request is registered as a copy source logical volume in the existing pairs, judging whether or not a response from the secondary storage system is a rejection of the remote copy pair forming instruction, and notifying a computer of a failure in forming the pair if the response is a rejection of the pair forming instruction.

12. The method according to claim 2, further comprising:

judging that the primary storage system has allowed the remote copy pair to be formed, executing the requested request if the primary storage system has allowed the pair to be formed, and judging whether or not the copy target logical volume of the received pair information is registered as a copy logical source volume in any of existing pairs if the primary storage system has not allowed the pair to be formed.

* * * * *